(12) United States Patent
Asai

(10) Patent No.: US 7,275,778 B2
(45) Date of Patent: Oct. 2, 2007

(54) VEHICLE SUN VISORS

(75) Inventor: Takashi Asai, Toyota (JP)

(73) Assignees: Kyoma Sangyo Co, Ltd, Aichi-Ken (JP); Shinwa Seiko Co, Ltd, Aichi-Ken (JP)

( * ) Notice: Subject to any disclaimer, the term of this patent is extended or adjusted under 35 U.S.C. 154(b) by 89 days.

(21) Appl. No.: 11/159,936

(22) Filed: Jun. 23, 2005

(65) Prior Publication Data

US 2005/0285427 A1    Dec. 29, 2005

(30) Foreign Application Priority Data

| Jun. 25, 2004 | (JP) | ............................. 2004-188263 |
| Jan. 7, 2005  | (JP) | ............................. 2005-002542 |
| Jan. 7, 2005  | (JP) | ............................. 2005-002543 |
| Jan. 21, 2005 | (JP) | ............................. 2005-014193 |
| Jan. 21, 2005 | (JP) | ............................. 2005-014194 |

(51) Int. Cl.
B60J 3/02    (2006.01)

(52) U.S. Cl. .................................................. 296/97.11

(58) Field of Classification Search ............... 296/97.1, 296/97.8, 97.9, 97.11, 97.12
See application file for complete search history.

(56) References Cited

U.S. PATENT DOCUMENTS

| 5,000,506 A | * | 3/1991 | Abu-Shumays et al. ... 296/97.8 |
| 5,104,174 A | * | 4/1992 | Gute .......................... 296/97.4 |
| 5,271,653 A | * | 12/1993 | Shirley ....................... 296/97.8 |
| 5,409,284 A | * | 4/1995 | Mahler ....................... 296/97.4 |
| 5,443,300 A | * | 8/1995 | Mohammed ............... 296/97.4 |
| 5,662,371 A | * | 9/1997 | Gera et al. ................. 296/97.8 |
| 5,720,508 A | * | 2/1998 | Mohammed ............... 296/97.4 |
| 6,979,042 B2 | * | 12/2005 | Kawasaki ................... 296/97.8 |
| 7,077,454 B1 | * | 7/2006 | Schambre ................... 296/97.8 |
| 2004/0056504 A1 | * | 3/2004 | Hattass et al. ............. 296/97.1 |
| 2004/0155489 A1 | * | 8/2004 | Kawasaki ................... 296/214 |
| 2005/0236864 A1 | * | 10/2005 | Asai ........................... 296/97.8 |
| 2006/0279101 A1 | * | 12/2006 | Sahara et al. .............. 296/97.8 |

FOREIGN PATENT DOCUMENTS

JP    2004-188263    7/2004

\* cited by examiner

*Primary Examiner*—H Gutman
(74) *Attorney, Agent, or Firm*—Conley Rose, P.C.

(57) ABSTRACT

A vehicle sun visor includes a visor body and a support and guide device that serve to hold and direct the visor body, so that the visor body is movable along a first direction between a storage position within a storage space defined within a vehicle cabin ceiling and a withdrawn position located outside of the storage space. A second support member is pivotally mounted to a first support member about a first axis so that the visor body is movable from the withdrawn position to a first light-shielding position. The visor body is pivotally mounted to the second support member about a second axis that is substantially perpendicular to the first axis so that the visor body is movable from a first light-shielding position to a second light shielding position as the visor body pivots about the second axis.

34 Claims, 21 Drawing Sheets

VEHICLE SUN VISORS

This application claims priority to Japanese patent application serial numbers 2004-188263, 2005-2542, 2005-2543, 2005-14193 and 2005-14193, the contents of which are incorporated herein by reference.

BACKGROUND OF THE INVENTION

1. Field of the Invention

The present invention relates to vehicle sun visors, and in particular vehicle sun visors having a visor body movable into and out of a storage space defined in a vehicle cabin ceiling.

2. Description of the Related Art

Japanese Laid-Open Utility Model Publication No. 62-197422 teaches a known vehicle sun visor that has a visor body movable into and out of a storage space defined in a vehicle cabin ceiling. As shown in FIG. 20, which corresponds to FIG. 1 of the publication, a storage space 103 is defined between a roof panel 101 and a roof lining 102. A pair of channel-like guide rails 105 (only one guide rail is shown in FIG. 20) is mounted within the storage space 103 and extends in forward and rearward directions (left and right directions as viewed in FIG. 20). A pair of rollers 115 (only one roller is shown in FIG. 20) is mounted to the rear upper end of a support member 110 and is respectively movable along the guide rails 105. A visor body 130 is pivotally mounted to a front end of the support member 110 via a horizontal shaft 120.

With this configuration, in order to use the visor body 130 for shielding sunlight, the operator may withdraw the visor body 130 together with the support member 110 from the storage space 103 to a withdrawing stroke end as the rollers 115 move along the guide rails 105. The operator may then pivot the visor body 130 downward about the horizontal shaft 120. Consequently, the visor body 130 may be set to a desired light-shielding position opposing a windshield (hereinafter called the "front light-shielding position"). The pivotal range of the visor body 130 is limited by the front end 102a of the roof lining 102.

However, the known vehicle sun visor still has the following operability problems:

(1) The sun visor is not configured to enable the positioning of the visor body 130 from a front light-shielding position to a side light-shielding position, a position where the visor body 130 opposes a side glass of the vehicle.

(2) During the movement of the visor body 130, the lower surfaces of the rollers 115 frictionally contact with the guide rails 105, producing opposing forces against the movement of the visor body 130 or causing rattling of the support member 110 or the visor body 130.

(3) The visor body 130 in the front light-shielding position may easily pivot away from the set position, for example, due to vibrations applied to the visor body 130 during the operation of the vehicle. Thus, the visor body 130 may pivot rearward by a distance corresponding to a space between the visor body 130 and the front end 102a of the roof lining 102 and may then move forward by the force of gravity or momentum. In some cases, such rearward and forward movement may be repeated.

SUMMARY OF THE INVENTION

It is accordingly an object of the present invention to teach vehicle sun visors that have a visor body movable into and out of a storage space defined within a vehicle cabin ceiling and are improved in operability.

In one aspect of the present teachings, vehicle sun visors are taught that include a visor body, and a support and guide device that serves to hold and direct the visor body. The visor body is movable along a first direction between a storage position within a storage space defined in a vehicle cabin ceiling and a withdrawn position located outside of or external to the storage space. The support and guide device has a stationary base fixedly mounted within the storage space, a guide mechanism mounted to the stationary base, and a support device guided by the guide mechanism. The support device includes a first support member and a second support member. The first support member is movable in a direction substantially parallel to the first direction, under the guidance of the guide mechanism. The second support member is pivotally mounted to the first support member about a first axis, so that the visor body is movable from the withdrawn position to a first light-shielding position, such as a front light-shielding position opposing a windshield of a vehicle, as the second support member pivots about the first axis. The visor body is pivotally mounted to the second support member about a second axis that is substantially perpendicular to the first axis. The visor body is movable from the first light-shielding position to a second light-shielding position, such as a side light-shielding position opposing a side glass of the vehicle, as the visor body pivots about the second axis.

Therefore, as the visor body is withdrawn from the storage position, the visor body may move together with the first and second support members. When the visor body has reached a fully withdrawn position, the visor body and the second support member may be pivoted relative to the first support member about the first axis. Therefore, the visor body may be positioned in a first light-shielding position. In addition, when the visor body in a first light-shielding position has pivoted about the second axis relative to the second support member, the visor body may be positioned at a second light-shielding position.

In this way, the visor body may be positioned in a second light-shielding position, which may be a side light-shielding position, in addition to the first light-shielding position, which may be a front light-shielding position.

In another aspect of the present teachings, vehicle sun visors are taught that include a visor body, and a support and guide mechanism that serves to support and guide the visor body. The visor body is movable along a first direction between a storage position within a storage space defined within a vehicle cabin ceiling and a withdrawn position located outside of the storage space. The support and guide mechanism has a stationary rail and a slidable rail. The stationary rail is fixedly mounted within the storage space and extends substantially parallel to the first direction. The slidable rail is slidable relative to and along the stationary rail. The slidable rail supports the visor body. A plurality of rolling members is disposed between the stationary rail and the slidable rail and rotatably contact therewith. The rolling members are arranged in series in a direction substantially parallel to the first direction. For example, the rolling members may be spherical balls, such as bearing balls, or cylindrical rollers, such as bearing rollers.

With this arrangement, as the visor body moves the slidable rail slides along the stationary rail while the rolling members rotate. Therefore, the visor body can easily and smoothly move into and out of the storage space.

In one embodiment, the slidable rail includes a first slidable rail slidable relative to and along the stationary rail, and a second slidable rail slidable relative to and along the first slidable rail. The visor body is mounted to the second slidable rail. The rolling members may include a plurality of first rolling members disposed between the stationary rail and the first slidable rail and a plurality of second rolling members disposed between the first slidable rail and the second slidable rail.

With this arrangement, the slidable rail is configured as a nested rail. As a result, the lengths of the first and second slidable rails as well as the length of the stationary rail can be minimized. Therefore, the support and guide mechanism can be disposed within the storage space of a vehicle cabin ceiling having a limited length, while still ensuring a necessary stroke length of movement for the visor body.

In another embodiment, the vehicle sun visors further include a lock device that is operable to releasably lock the visor body in a storage position within the storage space. Therefore, the visor body can be reliably positioned within the storage space when the visor body is not being used. In addition, the visor body can be easily withdrawn by simply releasing the lock device.

The lock device may include a heart-shaped cam recess and a lock pin. The lock pin engages the cam recess to lock the visor body in the storage position when the visor body has moved from the withdrawn position to the storage position. The lock pin is disengaged from the cam recess, releasing the lock of the visor body when the visor body has been pressed so as to move the visor body (otherwise locked in a storage position) in a direction opposite to the withdrawing direction.

In a further aspect of the present teachings, vehicle sun visors are taught that include a visor body and a support and guide device that serves to hold and direct the visor body. The visor body is movable along a first direction between a storage position within a storage space defined within a vehicle cabin ceiling and a withdrawn position located outside of the storage space. The visor body is pivotable about a first axis so as to move from the withdrawn position to a first light-shielding position, such as a front light-shielding position. And the visor body is pivotable about a second axis that is substantially perpendicular to the first axis so as to move from the first light shielding position to a second light-shielding position, such as a side light-shielding position. A pivotal movement stopping device is operable so as to prevent the visor body from further pivoting about the first axis while the visor body is being pivoted about the second axis from the first light-shielding position to the second light-shielding position.

Therefore, it is possible to prevent the visor body from accidentally or inadvertently pivoting about the first axis when the visor body is being used in the second light-shielding position.

In one embodiment, the pivotal movement stopping device includes a first stopper, a first engaging member, and a second engaging member. The first stopper is fixed in position with respect to a direction substantially perpendicular to the first direction. For example, the first stopper may be fixed to a roof panel or any other member mounted to the roof panel. Otherwise, the first stopper may be fixed to a member coupled to the visor body and movable with the visor body in the first direction. The first engaging member and the second engaging member are movable with the visor body and respectively oppose the first stopper in a first pivotal direction about the first axis and a second pivotal direction opposite to the first pivotal direction, when the visor body is in the second light-shielding position. For example, the first engaging member and the second engaging member may be mounted to or formed with the visor body or with any other member movable with the visor body.

With this arrangement, the visor body can be reliably prevented from pivoting about the first axis in either direction when the visor body is being used in the second light-shielding position.

In another aspect of the present teachings, vehicle sun visors are taught that include a visor body and a support and guide device that serves to support and guide the visor body. The visor body is movable along a first direction between a storage position within a storage space defined within a vehicle cabin ceiling and a withdrawn position out of or external to the storage space. The visor body is pivotable about a first axis so as to move from the withdrawn position to a first light-shielding position, such as a front light-shielding position. A rearward movement stopping device is operable to prevent the visor body from moving rearward toward the storage position after the visor body has been pivoted to the first light-shielding position.

Therefore, the visor body can be reliably prevented from accidentally moving toward the storage position when being used in a light-shielding position.

In one embodiment, the rearward movement stopping device includes a stopper and an engaging member. The stopper is fixed in position with respect to the vehicle cabin ceiling. For example, stopper may be fixed to the roof panel or any other member mounted to the roof panel. The engaging member is movable with the visor body and opposes the stopper in a direction substantially parallel to the first direction when the visor body has pivoted to the first light-shielding position. For example, the engaging member may be mounted to or formed with the visor body or another member mounted to the visor body and movable with the visor body.

Preferably the stopper has a stopper portion extending substantially perpendicular to the first direction. The engaging member defines a substantially arc-shaped engaging surface about the first axis so that the engaging surface opposes the stopper portion of the stopper in a direction substantially parallel to the first direction when the visor body has been pivoted to a first light-shielding position. The engaging surface does not oppose the stopper portion of the stopper to permit movement of the visor body in the first direction when the visor body has not been pivoted to the first light-shielding position.

Therefore, the engaging member does not interact with the movement of the visor body in the first direction. In other words, the operation of the sun visor does not require separately moving the engaging member in order to avoid interaction of the engaging member with the stopper during the movement between the storage position and the withdrawn position.

In one embodiment, the stopper portion has a substantially arc-shaped configuration conforming to the configuration of the engaging surface of the engaging member. The stopper portion frictionally contacts with the engaging surface when the visor body is in a first light-shielding position. Thus, the stopper may frictionally engage the visor body when the visor body is being used in a light-shielding position.

DETAILED DESCRIPTION OF THE INVENTION

Figure 1:
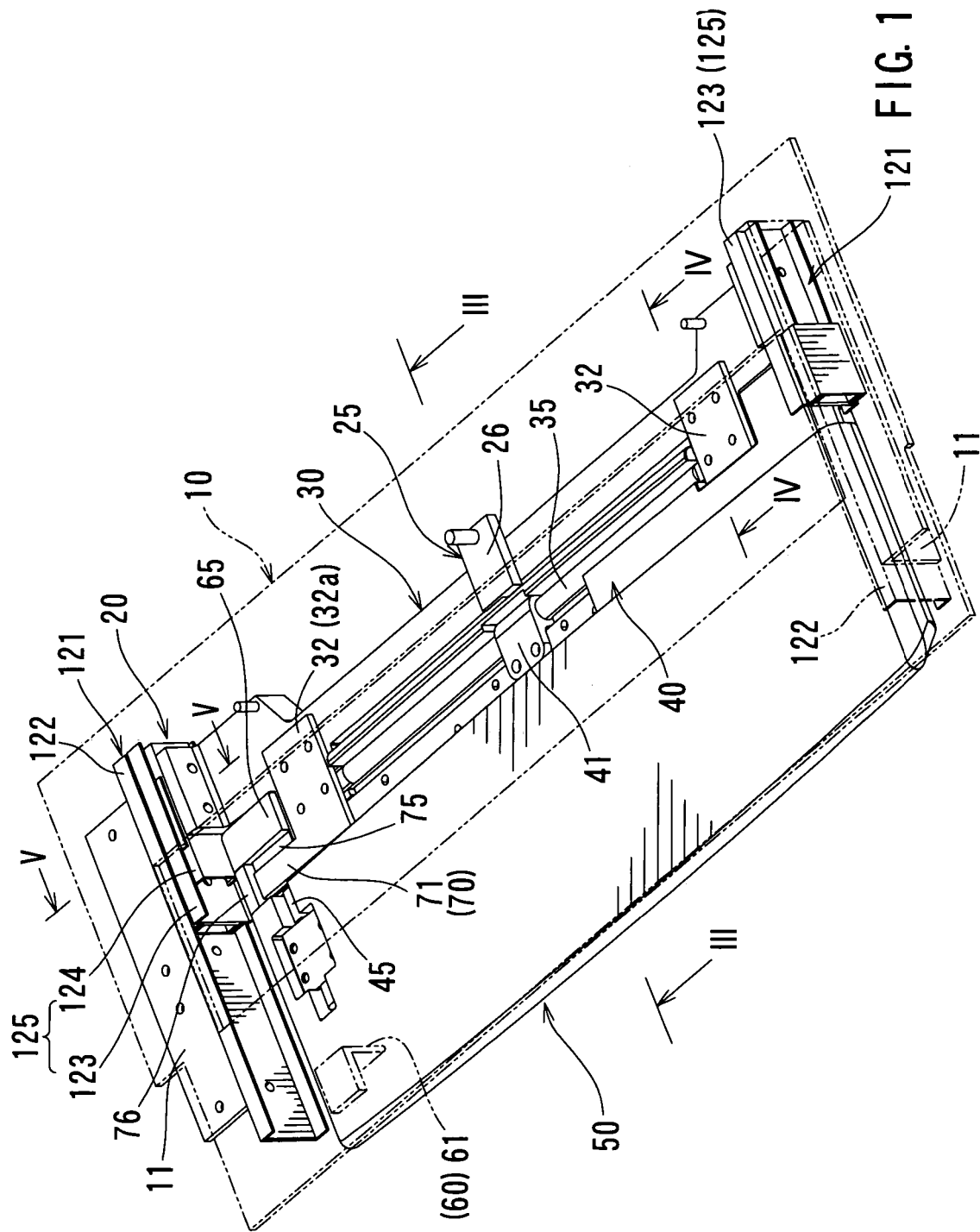
FIG. 1 is a perspective view as viewed from the upper side of a vehicle sun visor according to a first representative embodiment of the present invention and showing a visor body stored within a storage space of a vehicle cabin ceiling.

Each of the additional features and teachings disclosed above and below may be utilized separately or in conjunction with other features and teachings to provide improved vehicle sun visors and methods of manufacturing such vehicle sun visors. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

FIRST REPRESENTATIVE EMBODIMENT

A first representative embodiment will now be described with reference to FIGS. 1 to 4. A right side sun visor is used for the detailed description in the following embodiments but a person of average skill in the art will be able to apply the teachings to a corresponding left side sun visor. Referring to FIG. 3, a storage space 3 is defined between a roof panel 1 and a roof lining 2 of a vehicle cabin ceiling. An opening 4 is formed in the front portion of the roof lining 2, so that the storage space 3 is opened at the front side via the opening 4. A vehicle sun visor is disposed within the storage space 3 and generally includes a stationary base 10, a movable support device 20, and a visor body 50, which are all assembled into a single unit.

Figure 2:
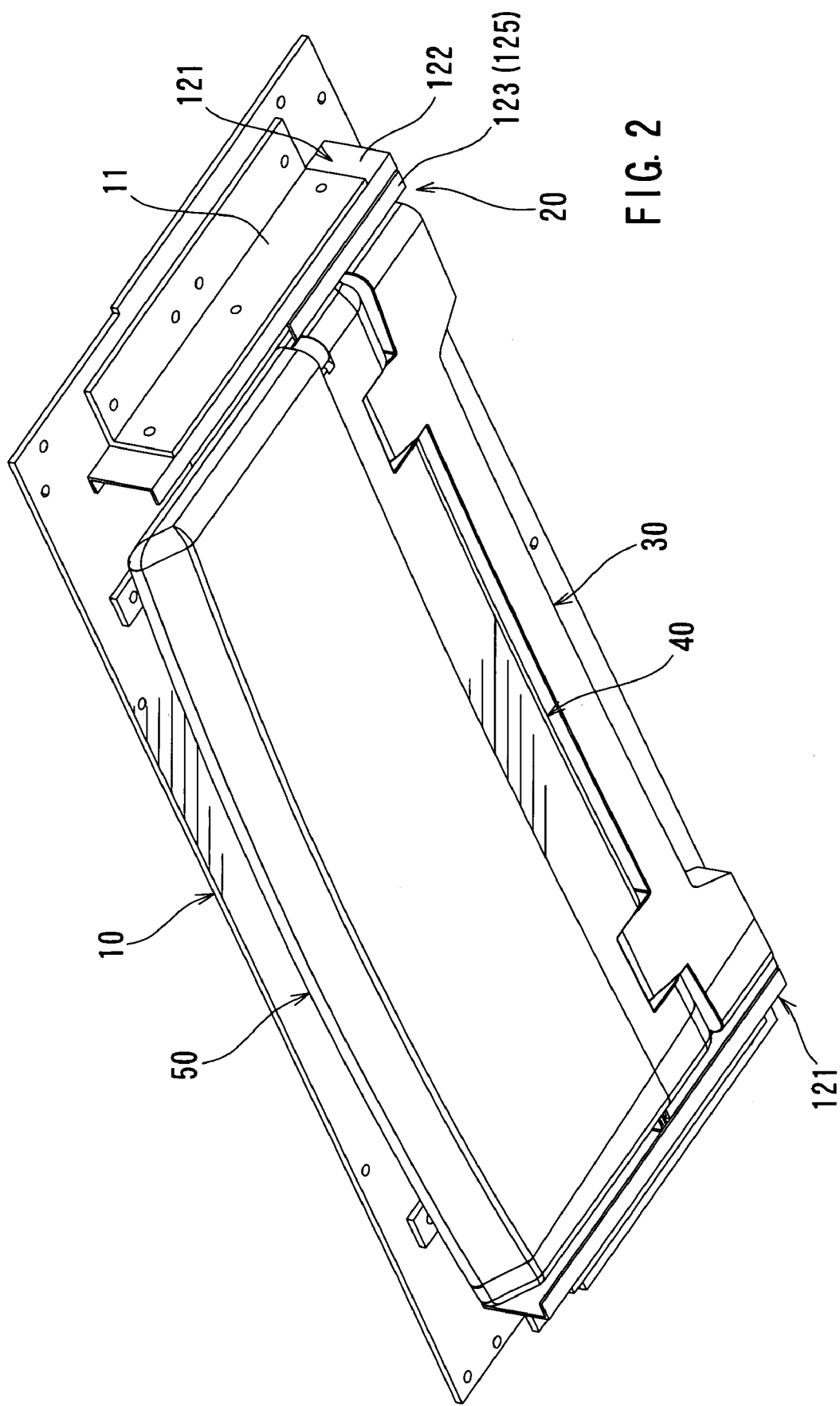
FIG. 2 is a perspective view as viewed from the lower side of the vehicle sun visor and showing the visor body stored within the storage space.
Figure 3:
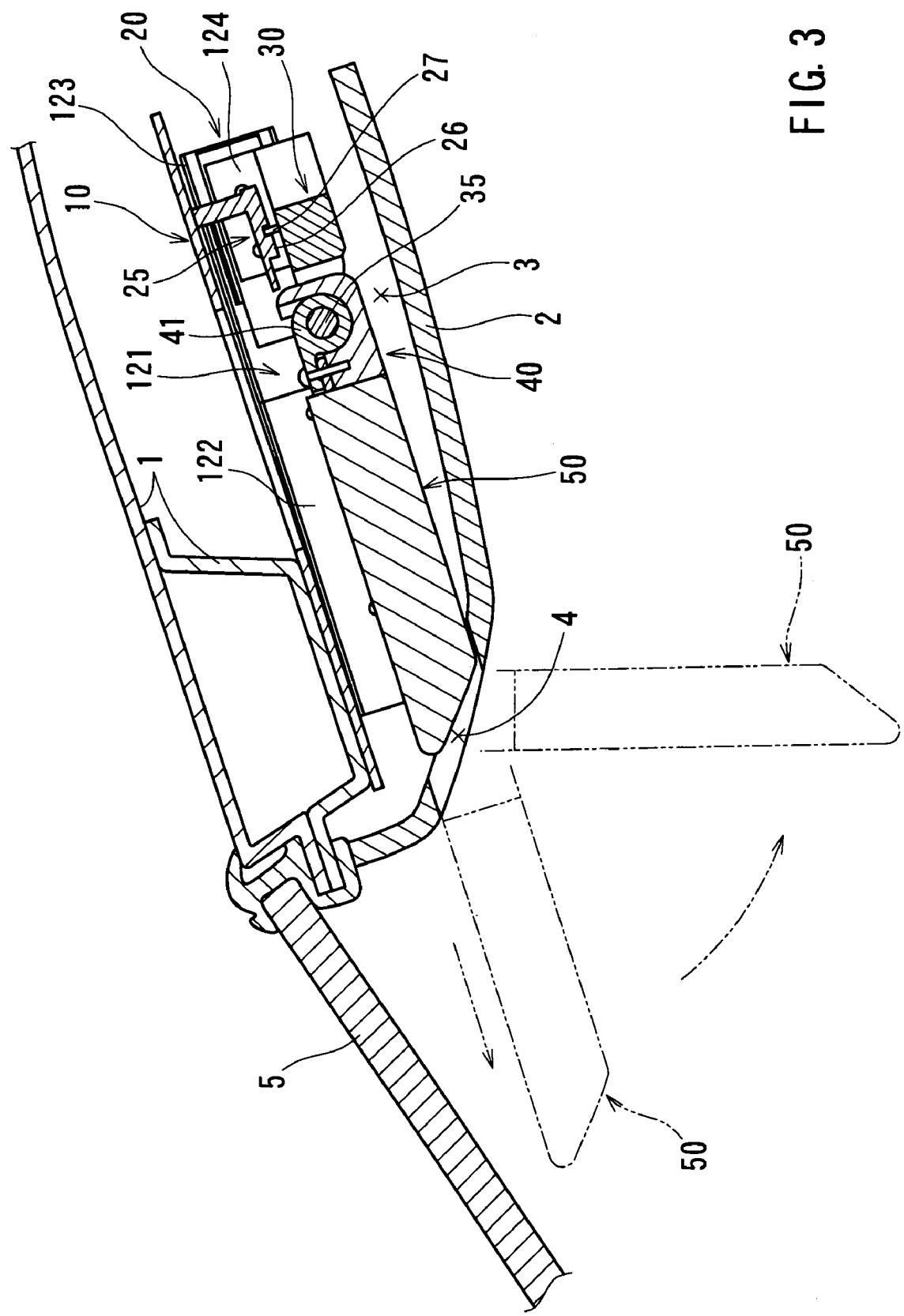
FIG. 3 is a partial cross-sectional view taken along line III-III in FIG. 1.
Figure 4:
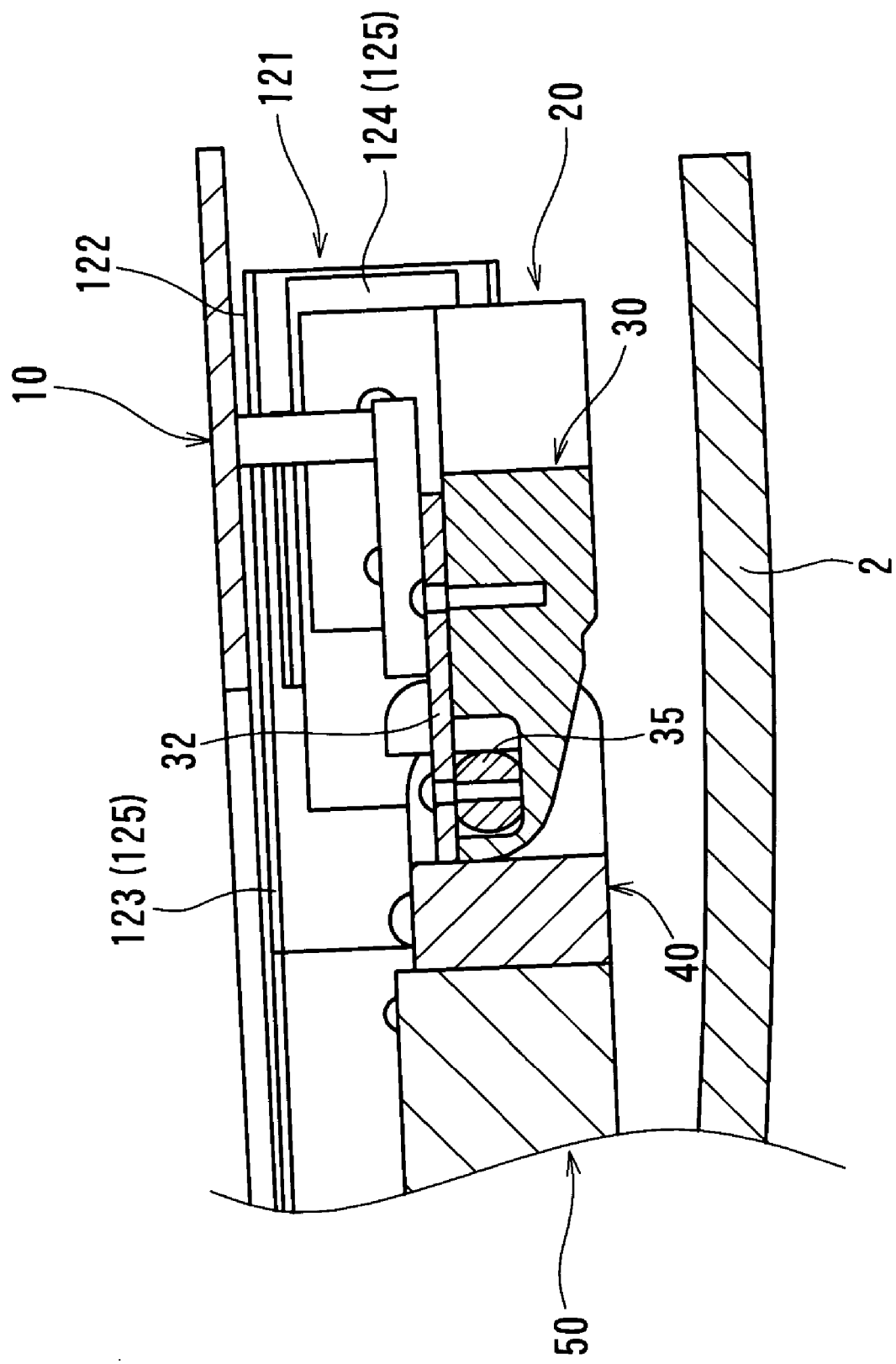
FIG. 4 is a partial cross-sectional view taken along line IV-IV in FIG. 1.

As shown in FIGS. 1 to 3, the stationary base 10 has a substantially rectangular configuration and is fixedly attached to the lower surface of the roof panel 1 by screws, or the like, fixing devices. Preferably, the stationary base 10 may be a metal plate, such as a steel plate. Right and left side brackets 11, each having a substantially L-shaped cross-section, are respectively secured to right and left side portions of the lower surface of the stationary base 10. The movable support device 20 is mounted between the right and left side brackets 11 and serves to support the visor body 50 such that the visor body 50 can move into and out of the storage space 3.

As further shown in FIGS. 1 to 3, the movable support device 20 includes a guide rail mechanism 121, a first support member 30, and a second support member 40. The guide rail mechanism 121 is mounted to the stationary base 10. The first support member 30 is movable in forward and rearward directions under the guidance or direction of the guide rail mechanism 121. The second support member 40 is vertically pivotally mounted to the first support member 30 via a crosswise shaft 35. In this embodiment, the crosswise shaft 35 extends substantially in a horizontal direction.

Figure 5:
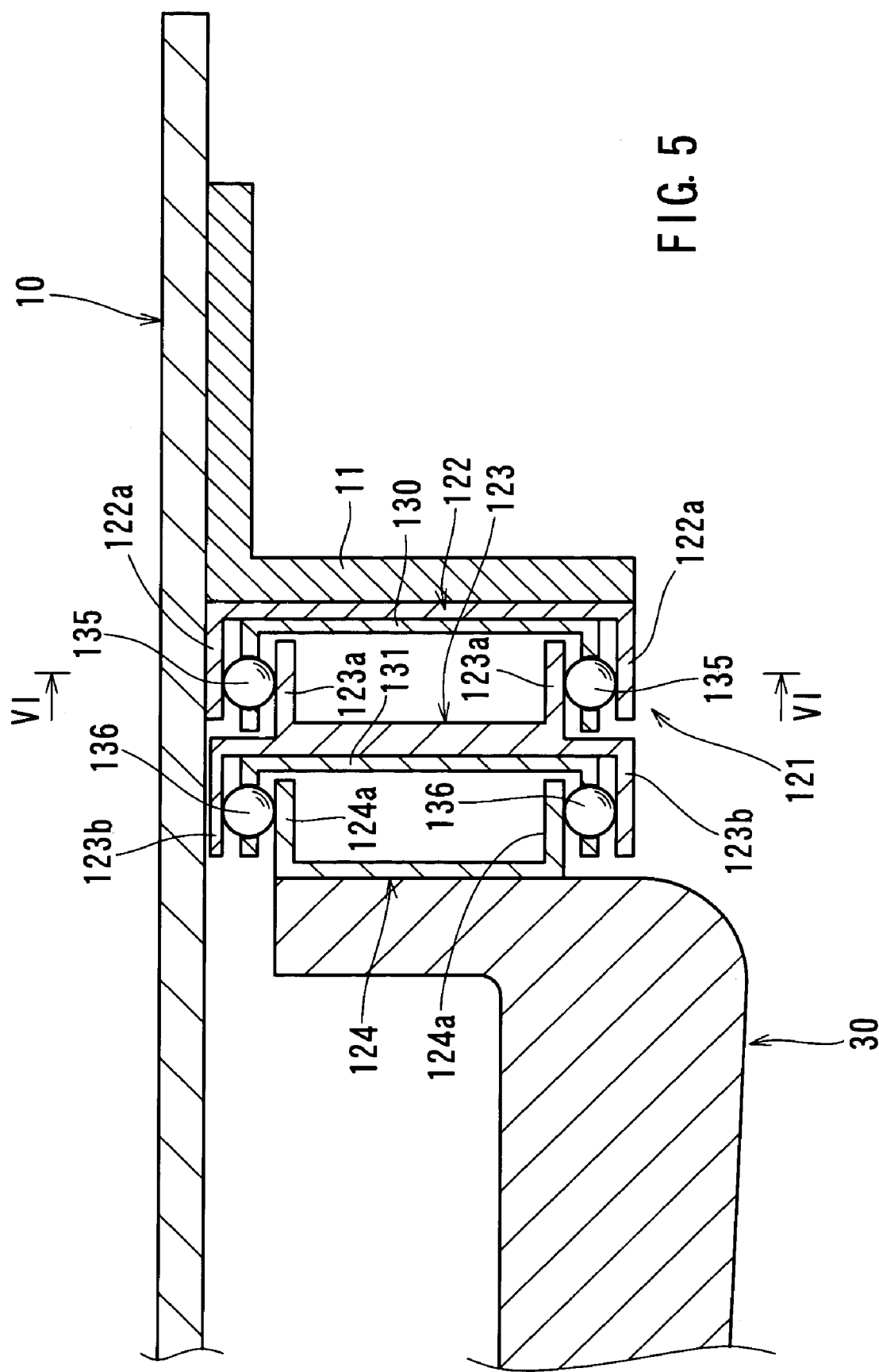
FIG. 5 is a partial cross-sectional view of a guide mechanism of the vehicle sun visor taken along line V-V in FIG. 1.

As shown in FIGS. 1 and 2, the guide rail mechanism 121 has right and left stationary rails 122, and right and left slidable rails 125. The stationary rails 122 are fixedly mounted within the storage space 3. More specifically, as shown in FIG. 5, the stationary rails 122 are respectively fixedly mounted to the inner side surfaces of the brackets 11 by screws, pins, or the like, fixing devices and extend in forward and rearward directions. The slidable rails 125 are respectively movable in forward and rearward directions together with the visor body 50 along the stationary rails 122. In addition, each of the slidable rails 125 may have a first slidable rail 123 and a second slidable rail 124 that are slidable relative to each other in the forward and rearward directions. The first slidable rails 123 and the second slidable rails 124 are assembled in a nested manner.

Figure 6:
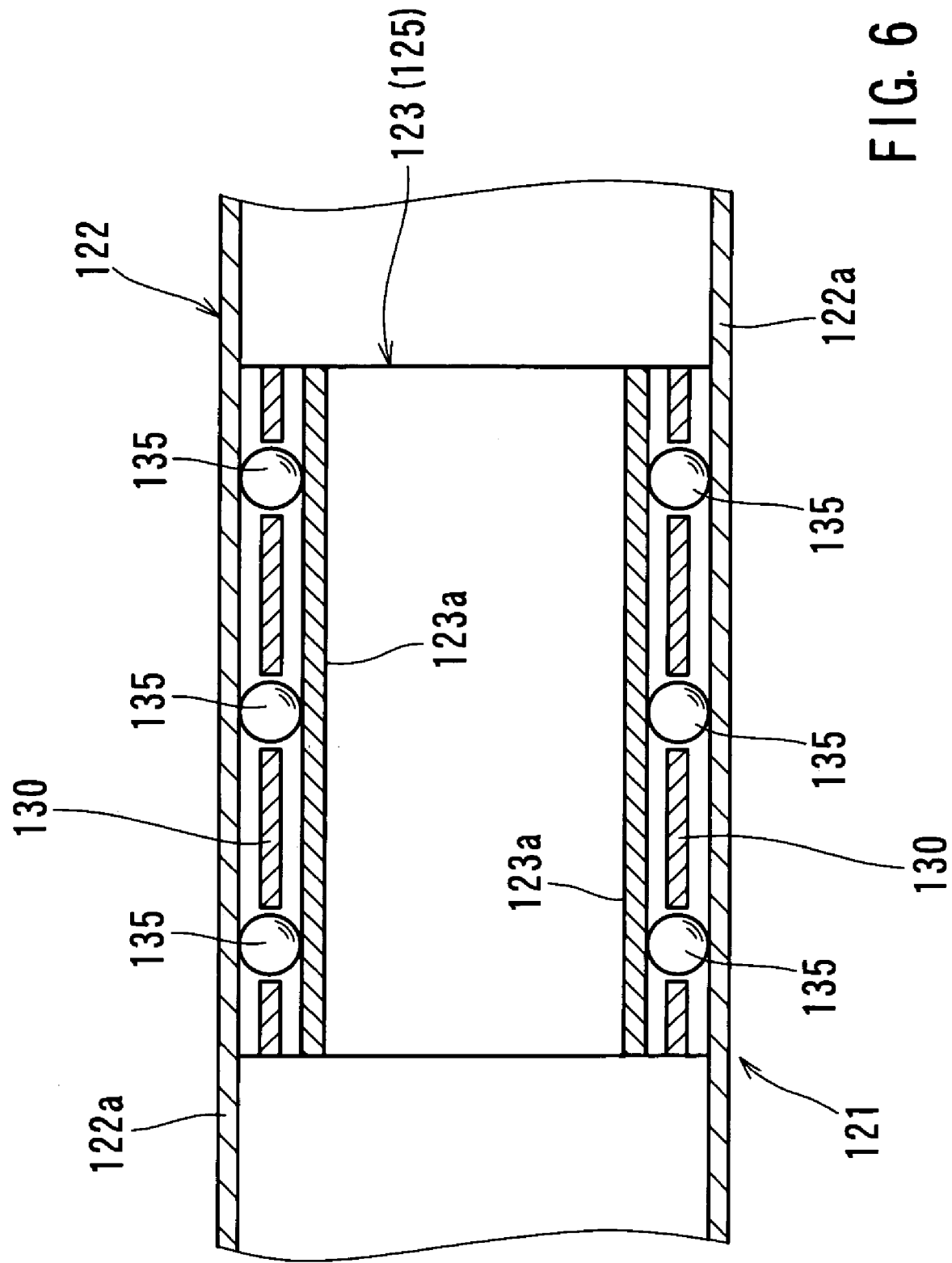
FIG. 6 is a partial cross-sectional view taken along lien VI-VI in FIG. 5.

As shown in FIGS. 5 and 6, each of the stationary rails 122 has upper and lower rail members 122a that oppose each other in the vertical direction and extend horizontally inwardly (e.g., leftward in the right side view shown in FIG. 5) towards the corresponding slidable rail 125. The first slidable rail 123 of each slidable rail 125 has upper and lower slidable rail members 123a that oppose each other in the vertical direction and extend horizontally outwardly (e.g., rightward in the right side view shown in FIG. 5) towards the corresponding stationary rail 122, so as to be inserted between the rail members 122a of the stationary rail 122. Two parallel rows of rolling members 135 are disposed between the inner walls of the rail members 122a of the stationary rail 122 and the corresponding outer walls of the slidable rail members 123a of the first slidable rail 123, so as to slidably or rotatably contact with these walls. The rolling members 135 in each row are arranged in series in the forward and rearward directions along the rails 122 and 123. In addition, a retainer 130 rotatably supports the two rows of rolling members 135. In this representative embodiment, the rolling members 135 may be spherical balls, such as steel balls used in bearings.

In addition, as shown in FIG. 5, the first slidable rail 123 of each slidable rail 125 has other upper and lower slidable rail members 123b that oppose each other in the vertical direction and extend horizontally inwardly (e.g., leftward in the right side view shown in FIG. 5). Further, the second slidable rail 124 of each slidable rail 125 has upper and lower slidable rail members 124a that oppose each other in the vertical direction and extend horizontally outwardly (e.g., rightward in the right side view shown in FIG. 5) toward the corresponding first slidable rail 123 so as to be inserted between the slidable rail members 123b of the first slidable rail 123. Two parallel rows of rolling members 136 are disposed between the inner walls of the slidable rail members 123b of the first slidable rail 123 and the corresponding outer walls of the slidable rail members 124a of the second slidable rail 124, so as to slidably contact with these walls. Also, the rolling members 136 in each row are arranged in series in the forward and rearward directions along the rails 123 and 124. In addition, a retainer 131 rotatably supports the two rows of the rolling members 136. In this representative embodiment, the rolling members 136 are spherical balls, such as steel balls used in bearings.

The first support member 30 has a configuration elongated in the right and left directions between the second slidable rails 124. The first support member 30 is joined to the right and left second slidable rails 124. As shown in FIGS. 1 to 4, the crosswise shaft 35 for pivotally supporting the second support member 40 is mounted to the front side of the first support member 30. The crosswise shaft 35 is prevented from rotating relative to the first support member 30 by right and left support plates 32 that are mounted to the first support member 30 in positions proximal to the opposing ends of the crosswise shaft 35. The second support member 40 is joined to the crosswise shaft 35 so that the second support member 40 is rotatable relative to the crosswise shaft 35. A friction member 41 is mounted to the support member 40 and frictionally engages with the crosswise shaft 35 in order to apply a suitable frictional force opposing the rotation of the second support member 40 relative to the crosswise shaft 35.

Figure 13:
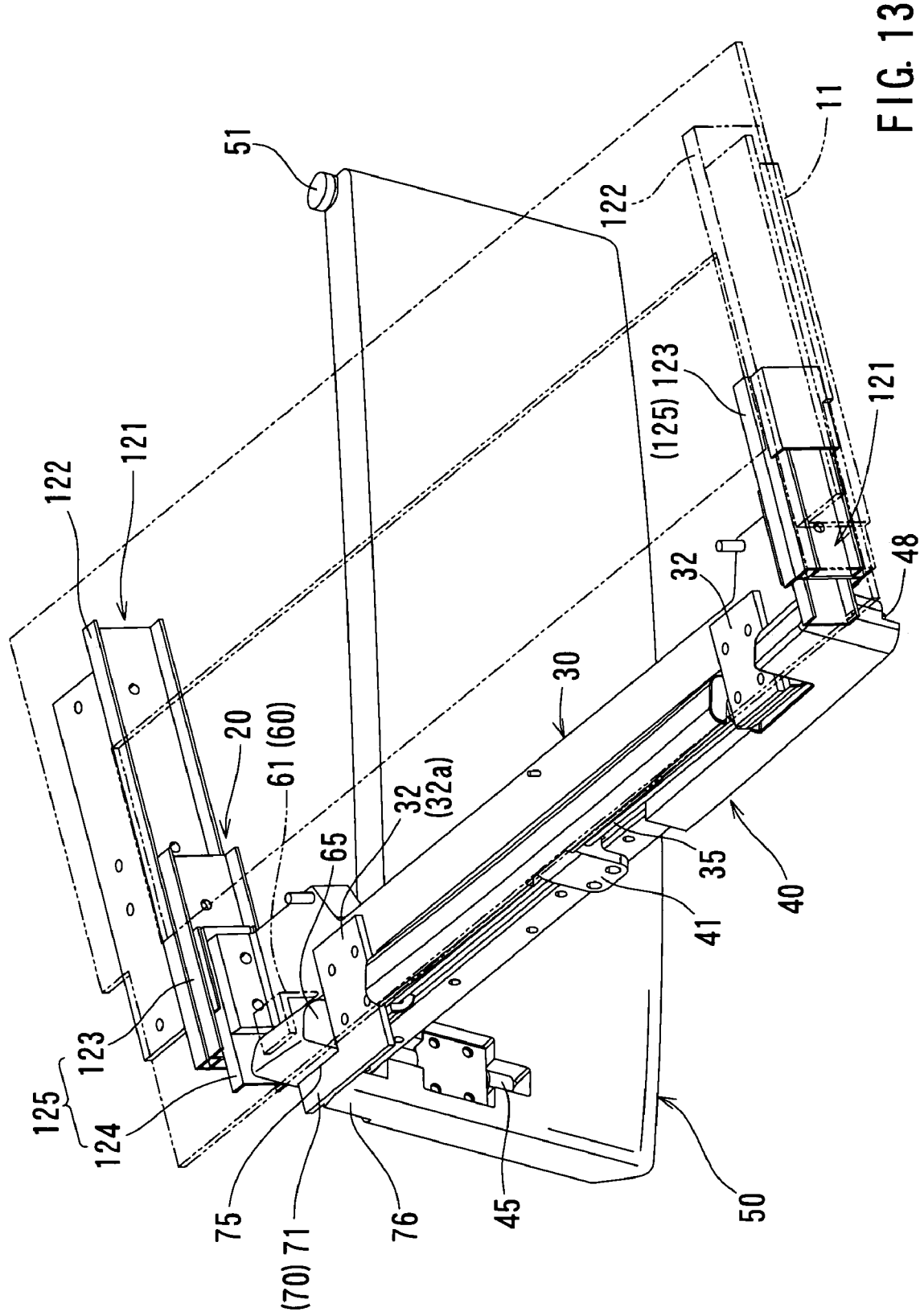
FIG. 13 is a perspective view as viewed from the upper side of the vehicle sun visor and showing the visor body positioned at a side light-shielding position.

Referring to FIG. 1, a lengthwise shaft 45 extends in the lengthwise direction (forward and rearward directions) from the front end of the second support member 40. More specifically, the lengthwise shaft 45 is positioned adjacent to the right end of the front end of the second support member 40. The right end of the visor body 50 is joined to the second support member 40 via the lengthwise shaft 45, so that the visor body 50 can pivot about the lengthwise shaft 45. As shown in FIG. 13, an engaging member 51 is mounted to the left end, i.e., the free end, of the visor body 50. In this connection, a resiliently engageable portion 48 is formed on the left end of the second support member 40 and is resiliently engageable with the engaging member 51 of the visor body 50.

Figure 7:
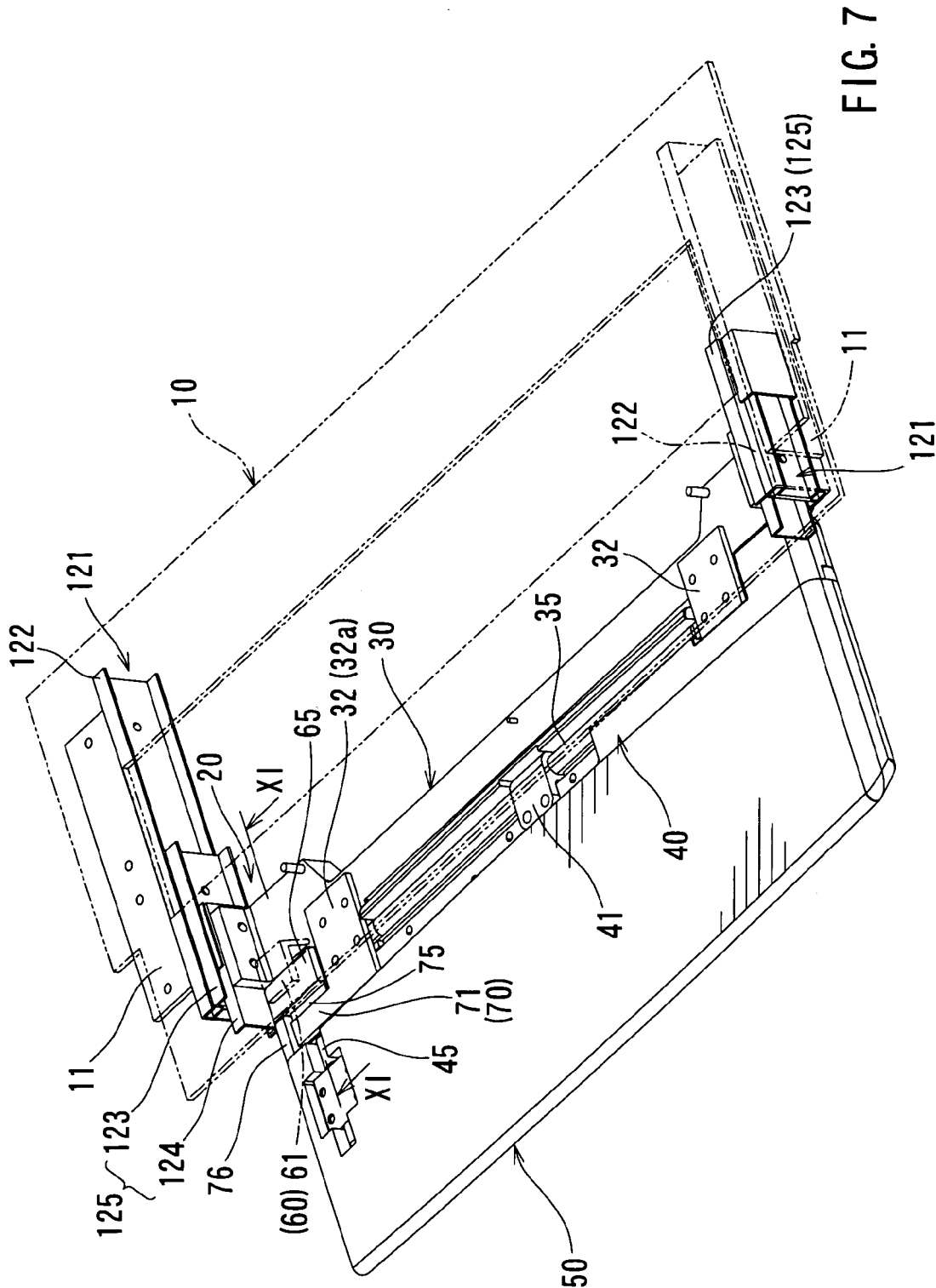
FIG. 7 is a perspective view as viewed from the upper side of the vehicle sun visor and showing the visor body withdrawn to reach a withdrawing stroke end.
Figure 8:
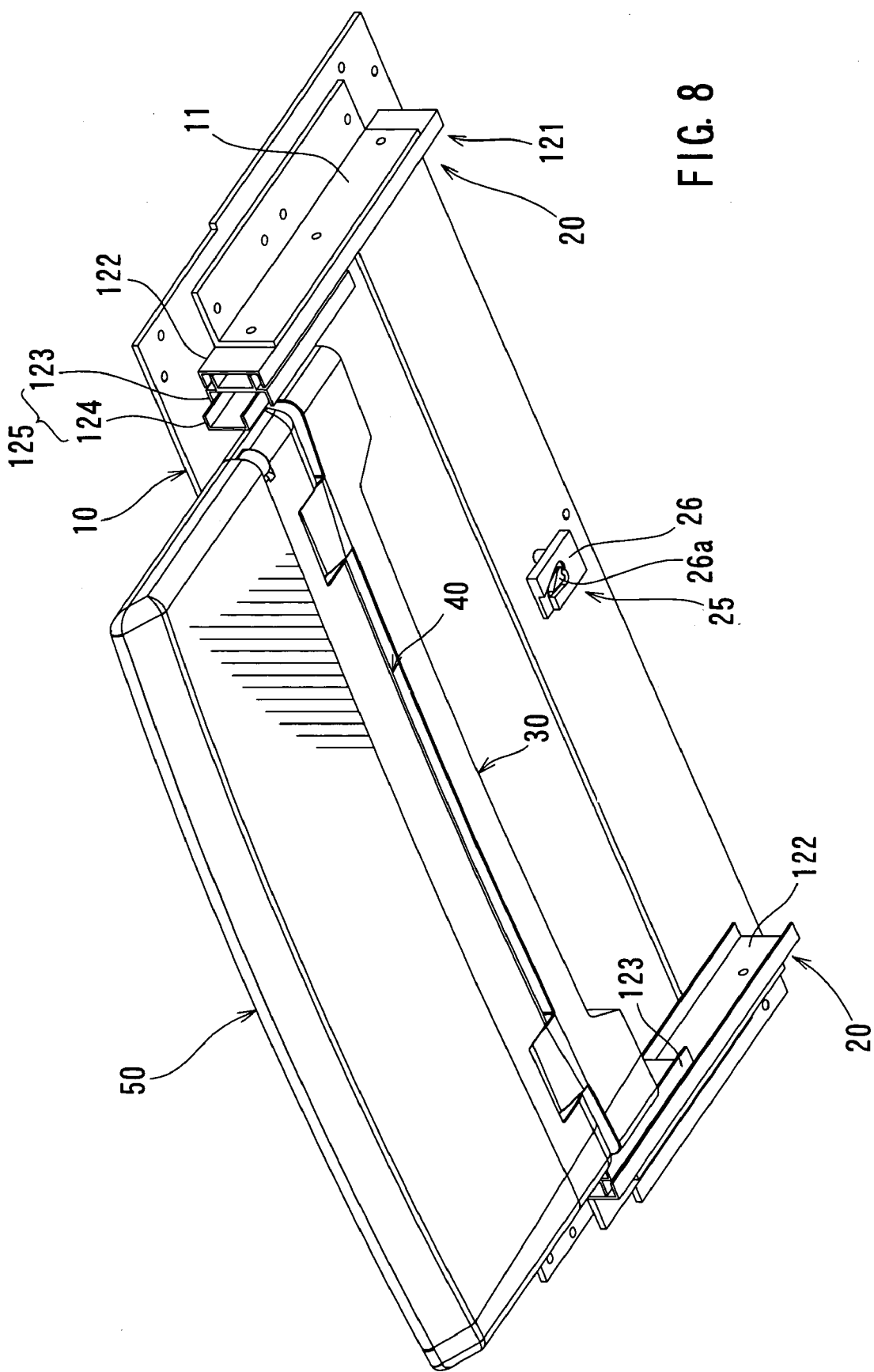
FIG. 8 is a perspective view as viewed from the lower side of the vehicle sun visor and showing the visor body withdrawn to reach the withdrawing stroke end.

In this way, the visor body 50 can be withdrawn to move out of the storage space 3 with the aid of the first and second support members 30 and 40 and the guide rail mechanism 121, as shown in FIGS. 7 and 8. In this representative embodiment, a stopper device is provided for preventing the visor body 50 from moving forwardly beyond a predetermined withdrawing stroke end. The stopper device may include engaging portions (not shown) that are formed on the stationary rails 122 and the first slidable rails 123 and the second slidable rails 124 of the slidable rails 125 for engaging with each other when the visor body 50 is at the end of the withdrawing stroke. This stopper device will be hereinafter called the "forward movement stopper device."

When the visor body 50 is at the end of the withdrawing stroke, the visor body 50 may be pivoted vertically about the transverse shaft 35 together with the second support member 40 so that the visor body 50 may be positioned in a front light-shielding position, where the visor body 50 opposes a windshield (not shown) of the vehicle. The angle of the visor body 50 at the front light-shielding position may be set as desired by an operator, i.e., a driver or a passenger of the vehicle. In addition, by pivoting the visor body 50 about the lengthwise shaft 45, the visor body 50 may be moved from a front light-shielding position to a side light-shielding position, where the visor body 50 opposes a side glass of the vehicle.

Further, as shown in FIGS. 1, 3, and 8, a lock device 25 is disposed between the first support member 30 and the stationary base 10 in order to releasably lock the visor body 50, together with the first and second support members 30 and 40, at a storage position within the storage space 3. The lock device 25 includes a cam plate 26 mounted to the stationary base 10 and a lock pin 27 mounted to the first support member 30. The lock pin 27 cooperates with a heart-shaped cam recess 26a formed in the cam plate 26 (see FIG. 8) so as to lock the first support member 30, and consequently the visor body 50, in the storage position with the aid of a spring (not shown). When the operator pushes the visor body 50, which is locked in the storage portion, so as to move the first support member 30 rearward by a little distance against the biasing force of the spring, the lock pin 27 may be disengaged from the cam recess 26a causing the release of the lock condition of the visor body 50. As a result of releasing the lock condition, the visor body 50 may be moved forward (i.e., in the withdrawing direction) for a predetermined distance by the biasing force of the spring, together with the first and second support members 30 and

40. The lock pin 27 may again engage the heart-shaped cam recess 26a to lock the visor body 50 in the storage position when the visor body 50 is pushed forward so as to reach the storage position. In this way, the lock device 27 is configured as a push-to-release type lock device. The lock pin 27 and the heart-shaped cam recess 26a themselves are well known in the art. Therefore, these elements will not be described in further detail.

Figure 9:
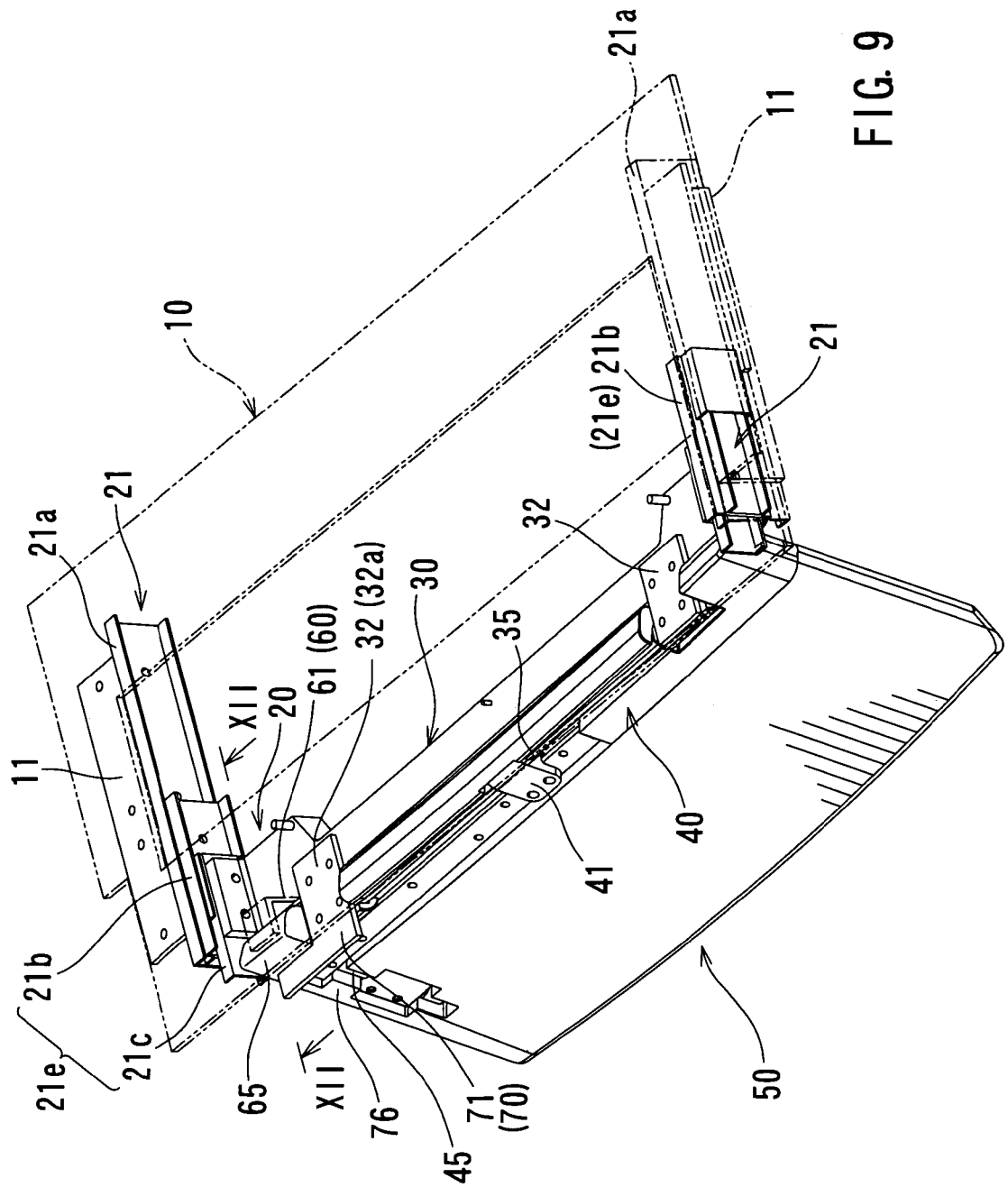
FIG. 9 is a perspective view as viewed from the upper side of the vehicle sun visor and showing the visor body positioned at a front light-shielding position.
Figure 12:
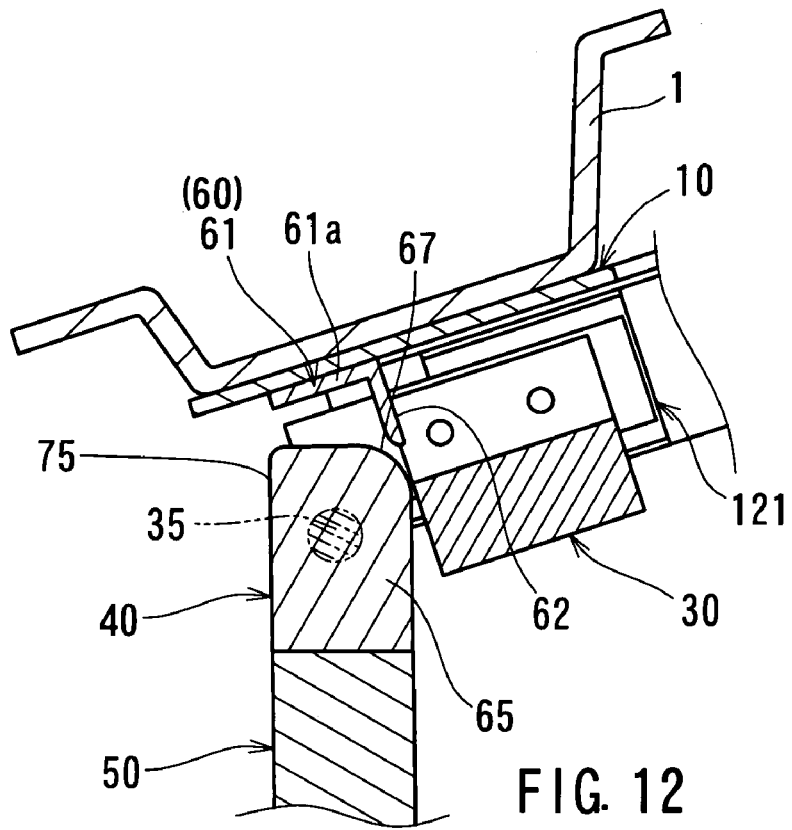
FIG. 12 is a partial cross-sectional view taken along line XII-XII in FIG. 9.

Furthermore, as shown in FIGS. 1, 9, and 12, a rearward movement stopper device 60 is disposed between the second support member 40 and the stationary base 10 in order to prevent the second support member 40, and consequently the visor body 50, from moving in the rearward direction when the visor body 50 is positioned in a front light-shielding position. As described previously, the visor body 50 is prevented from moving in the forward direction beyond the end of the withdrawing stroke by the forward movement stopper device, including the engaging portions formed on the stationary rails 122 and the first slidable rails 123 and the second slidable rails 124 of the slidable rails 125 of the guide rail mechanism 121. Therefore, the forward movement stopper device and the rearward movement stopper device 60 cooperate with each other to prevent undesired movement of the visor body 50 in either the forward or rearward directions when the visor body 50 is positioned in a front light-shielding position.

Figure 11:
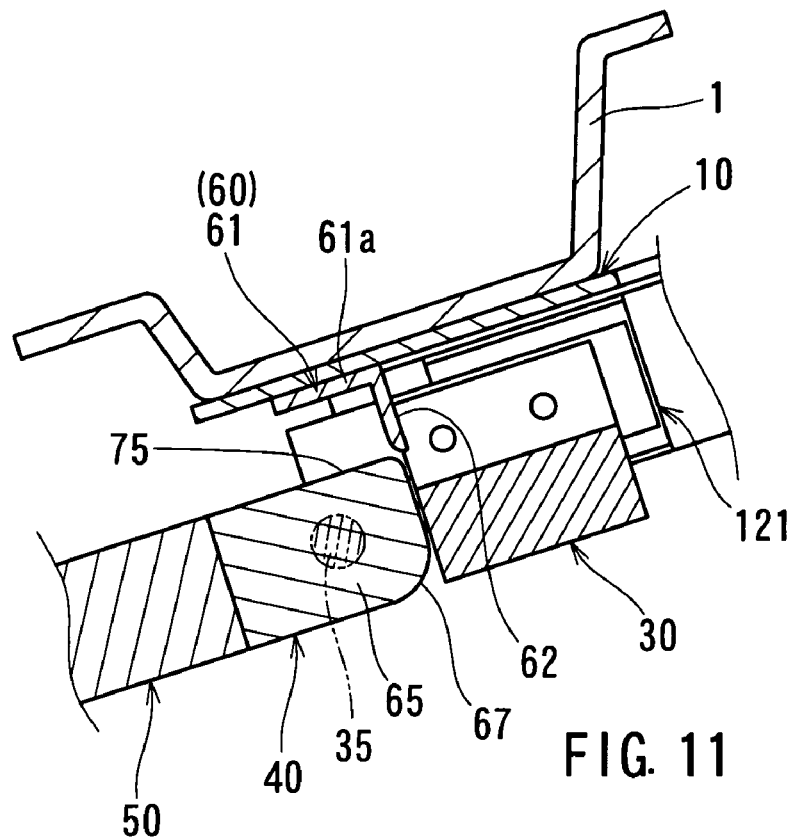
FIG. 11 is a partial cross-sectional view taken along line XI-XI in FIG. 7.

As shown in FIGS. 11 and 12, the rearward movement stopper device 60 includes a stopper 61 fixedly mounted to the stationary base 10 and an engaging portion 65 integrally formed with the right end of the second support member 40. The stopper 61 has a substantially inverted L-shaped cross-section and includes a mount portion 61a integrally formed with a stopper portion 62. The mount portion 61a is fixedly mounted to the right front portion of the lower surface of the stationary base 10. The stopper portion 62 extends substantially vertically from the rear end of the mount portion 61a.

The engaging portion 65 has an engaging surface 67 that is positioned to oppose the stopper portion 62 when the visor body 50 is in a light-shielding position. Preferably, the engaging surface 67 has a substantially arc-shaped configuration with respect to the central axis of the transverse shaft 35. Therefore, the engaging portion 65 may pass through the space below the stopper member 61 as the visor body 50 moves into and out of the storage space 3 if the second support portion 40 as well as the visor body 50 are positioned so as to extend substantially horizontally in the forward and rearward directions, as shown in FIG. 11.

As the visor body 50 as well as the second support member 40 are pivoted to a light-shielding position about the transverse shaft 35, after the visor body 50 has been withdrawn to the end of the withdrawing stroke, the second support member 40 may be moved to a substantially upright position, as shown in FIG. 12. The engaging surface 67 of the engaging portion 65 is moved upward to oppose the stopper portion 62 of the stopper 61 in the rearward direction. Therefore, the visor body 50 as well as the second support member 40 may be prevented from moving in the rearward direction through contact of the engaging surface 67 with the stopper portion 62 of the stopper 61.

Figure 14:
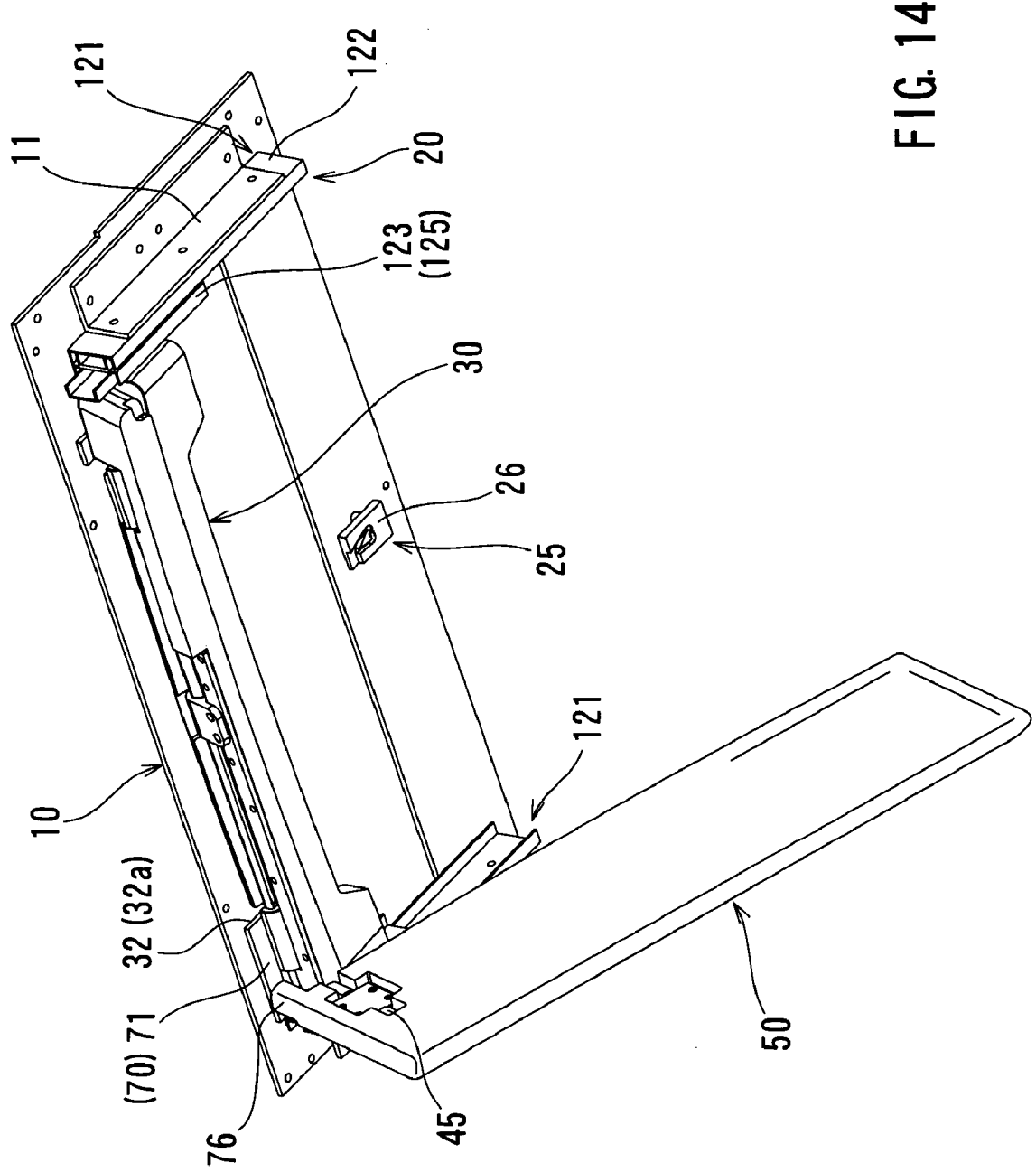
FIG. 14 a perspective view as viewed from the lower side of the vehicle sun visor and showing the visor body positioned at the side light-shielding position.

Further, as shown in FIGS. 13 and 14, a stopper device 70 is provided for preventing the visor body 50 from pivoting about the transverse shaft 35 when the visor body 50 has been positioned in a side light-shielding position. More specifically, the stopper device 70 includes a stopper 71, a first engaging portion 75, and a second engaging portion 76. The stopper 71 is formed integrally with one of the support plates 32 (i.e., such as the support plate labeled with reference numeral 32a) and extends to the front and to the right of the support plate 32. The first engaging portion 75 is formed by a surface of the engaging portion 65 of the second support member 40. The first engaging portion 75 opposes the rear side of the stopper 71 when the visor body 50 has been pivoted to a front light-shielding position about the transverse shaft 35. Therefore, the visor body 50 is prevented from further pivoting after the first engaging portion 75 has contacted the stopper 71. The second engaging portion 76 is formed integrally with the right end portion of the visor body 50, i.e., the end portion pivotally joined to the second support member 40. The second engaging portion 76 extends upward from the right end portion of the visor body 40 when the visor body 40 is in a front light-shielding position. Therefore, when the visor body 50 has pivoted to the side light-shielding position about the lengthwise shaft 45, the second engaging portion 76 may vertically oppose the lower surface of the stopper 71. Thus, the second engaging portion 76 may contact with the lower surface of the stopper 71 to prevent the visor body 50 from pivoting upward about the transverse shaft 35 after the visor body 50 has been positioned in a side light-shielding position.

The operation of the above representative embodiment will now be described. In order to move the visor body 50 from the storage position within the storage space 3 of the vehicle cabin ceiling, as shown in FIGS. 1 to 3, to a front light-shielding position at a desired angle, the operator may initially push the visor body 50 so as to move the visor body 50 by a little distance further into the storage space 3. Then, the engagement between the lock pin 27 and the heart-shaped cam recess 26a of the cam plate 26 of the lock device 25 may be released so that the visor body 50 (together with the first and second support members 30 and 40) may move forward by a predetermined distance due to the biasing force of the spring.

Thereafter, the operator may manually move the visor body 50 forward to further withdraw the visor body 50 with the aid of the guide rail mechanism 121. Thus, as the visor body 50 is withdrawn, the first slidable rails 123 of the slidable rails 125 respectively slide relative to the stationary rails 122 in the forward direction. In addition, the second slidable rails 124 and the first support member 30 mounted to the second slidable rails 124, respectively slide relative to the first slidable rails 123 of the slidable rails 125. Therefore, the visor body 50 as well as the first and second support members 30 and 40 can smoothly move to the end of the withdrawing stroke as shown in FIGS. 7 and 8.

Figure 10:
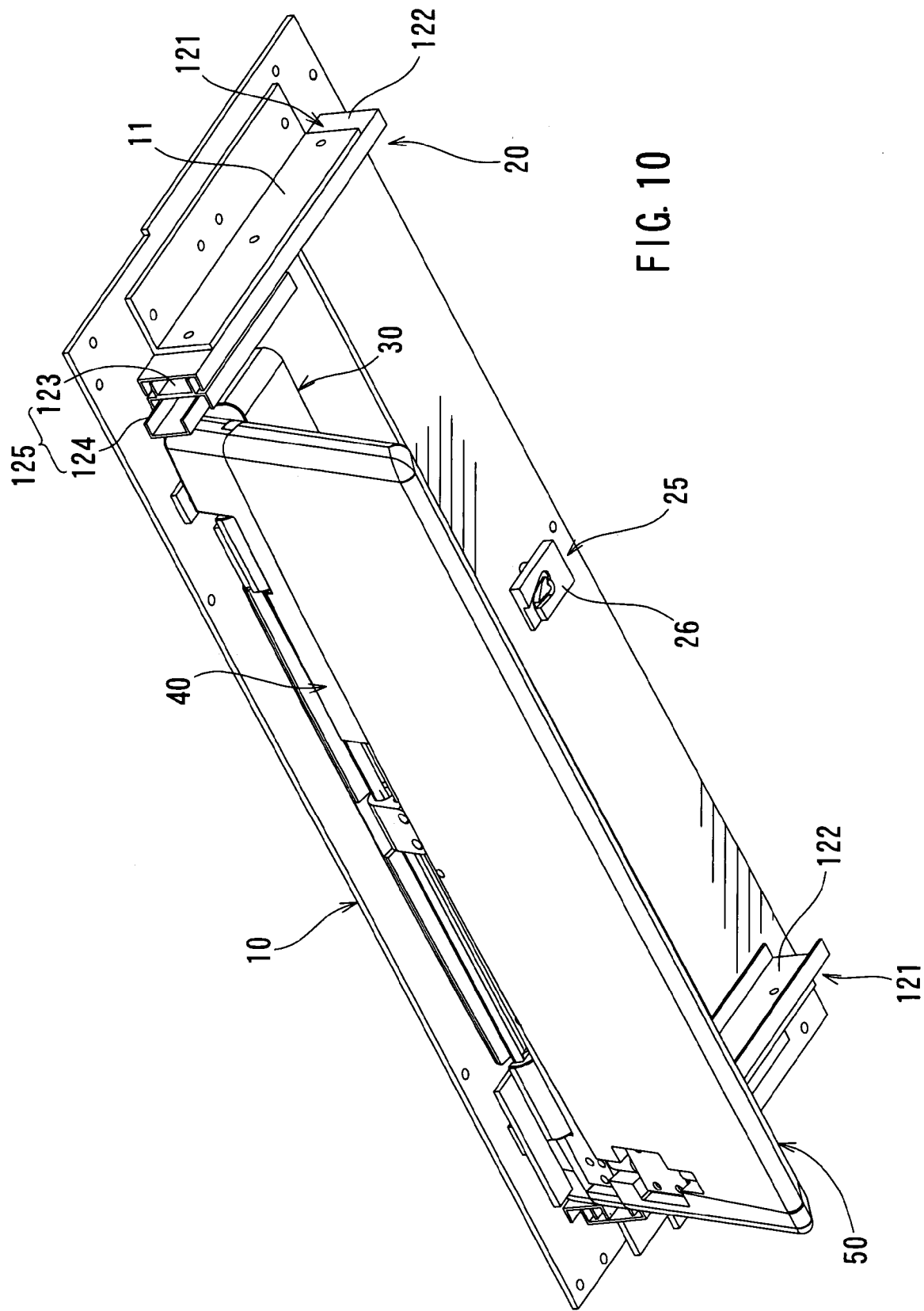
FIG. 10 is a perspective view as viewed from the lower side of the vehicle sun visor and showing the visor body positioned at the front light-shielding position.

After the visor body 50 has moved to the end of the withdrawing stroke, the operator may pivot the visor body 50 relative to the first support member 30 about the transverse shaft 35 together with the second support member 40. The visor body 50 may then be positioned in a front light-shielding position at a desired angle as shown in FIGS. 9 and 10.

In order to return the visor body 50 to the storage position within the storage space 3, the operator may manually move the visor body 50 in the inverse order of the above operation. When the visor body 50 has reached the storage position, the visor body 50 may be locked in this position by the lock device 25.

As described above, the guide rail mechanism 121 includes the stationary rail 122, the first slidable rail 123 and the second slidable rail 124. In addition, a plurality of rolling members 135 and a plurality of rolling members 136 are respectively disposed between the opposing walls of the stationary rail 122 and the first slidable rail 123 and between the first slidable rail 123 and the second slidable rail 124.

Therefore, as the visor body 50 moves into and out of the storage space 3, the first slidable rail 123 may slide relative to the stationary rail 122 while the rolling members 135 rotate, and the second slidable rail 124 may slide relative to the first slidable rail 123 while the rolling members 136 rotate. Therefore, the visor body 50 can easily and smoothly move into and out of the storage space 3.

In particular, the first and second slidable rails 123 and 124 constitute the slidable rails 125 that are configured as nested rails to extend and retract in the moving direction of the visor body 50 relative to the storage space 3. Therefore, the lengths of the first and second slidable rails 123 and 124 may be minimized, while ensuring the necessary stroke length of movement of the visor body 50. In other words, the length of the storage space 3 required for storing the first and second slidable rails 123 and 124 can be minimized. Therefore, the guide rail mechanism 121 can be positioned within a limited length of the storage space 3 of the vehicle cabin ceiling.

Further, in order to withdraw the visor body 50 that has been locked by the locking device 25, the operator may push the visor body 50 so as to move the visor body 50 by a little distance in the rearward direction, so that the engagement lock pin 27 is released from the heart-shaped cam recess 26a of the cam plate 26. The operator can then easily withdraw the visor body 50 to the end of the withdrawing stroke. In order to store the withdrawn visor body 50, the operator may push the visor body 50 so as to move the visor body 50 into the storage position, so that the lock pin 27 may automatically engage the heart-shaped cam recess 26a and the visor body 50 may be locked in the storage position.

Furthermore, as the visor body 50 at the end of the withdrawing stroke is pivoted to a front light-shielding position, the engaging surface 67 of the engaging portion 65 may move to oppose the stopper portion 62 of the rearward movement stopper device 60. Therefore, the rearward movement of the visor body 50 as well as the second support member 40 may be prevented due to contact between the engaging surface 67 and the stopper portion 62. In addition, the forward movement stopper device, including engaging portions formed on the stationary rails 122, first slidable rails 123, and the second slidable rails 124, prevent movement of the visor body 50 and the second support member 40 in the forward direction. As a result, the visor body 50 as well as the second support member 40 are reliably prevented from accidentally or inadvertently moving in either the forward or rearward directions, for example due to vibrations transmitted from the vehicle.

In particular, the engaging surface 67 of the engaging portion 65 is configured as an arc-shaped surface about the axis of the transverse shaft 35. Therefore, the engaging surface 67 may oppose to the stopper portion 62 substantially at any of the desired pivot angles in the front light-shielding position. Therefore, the forward and rearward accidental movement of the visor body 50 as well as the second support member 40 can be reliably prevented when the visor body 50 is in a front light-shielding position.

Furthermore, in this representative embodiment, the visor body 50 may be moved from a front light-shielding position to a side light-shielding position as the visor body 50 pivots about the axis of the lengthwise shaft 45, as shown in FIGS. 13 and 14. During this movement the visor body 50 may be prevented from moving in forward or rearward directions by the forward movement stopper device and the rearward movement stopper device 60. Therefore, the pivotal movement of the visor body 50 about the lengthwise shaft 45 can be performed easily and stably.

When the visor body 50 is being used in the side light-shielding position shown in FIGS. 13 and 14, the stopper device 70 is brought to an operative position where the first engaging portion 75 and the second engaging portion. 76 respectively oppose to the rear side and the lower side of the stopper 71. Therefore, the visor body 50 may be prevented from accidentally pivoting about the transverse shaft 35 when the visor body 50 is in a side light-shielding position.

Second to fifth representative embodiments will now be described with reference to FIGS. 15 to 19. The second to fifth representative embodiments are modifications of the first representative embodiment. Therefore, in FIGS. 15 to 19, like members are given the same reference numerals as in the first representative embodiment and the description of these members may not be repeated.

SECOND REPRESENTATIVE EMBODIMENT

Figure 15:
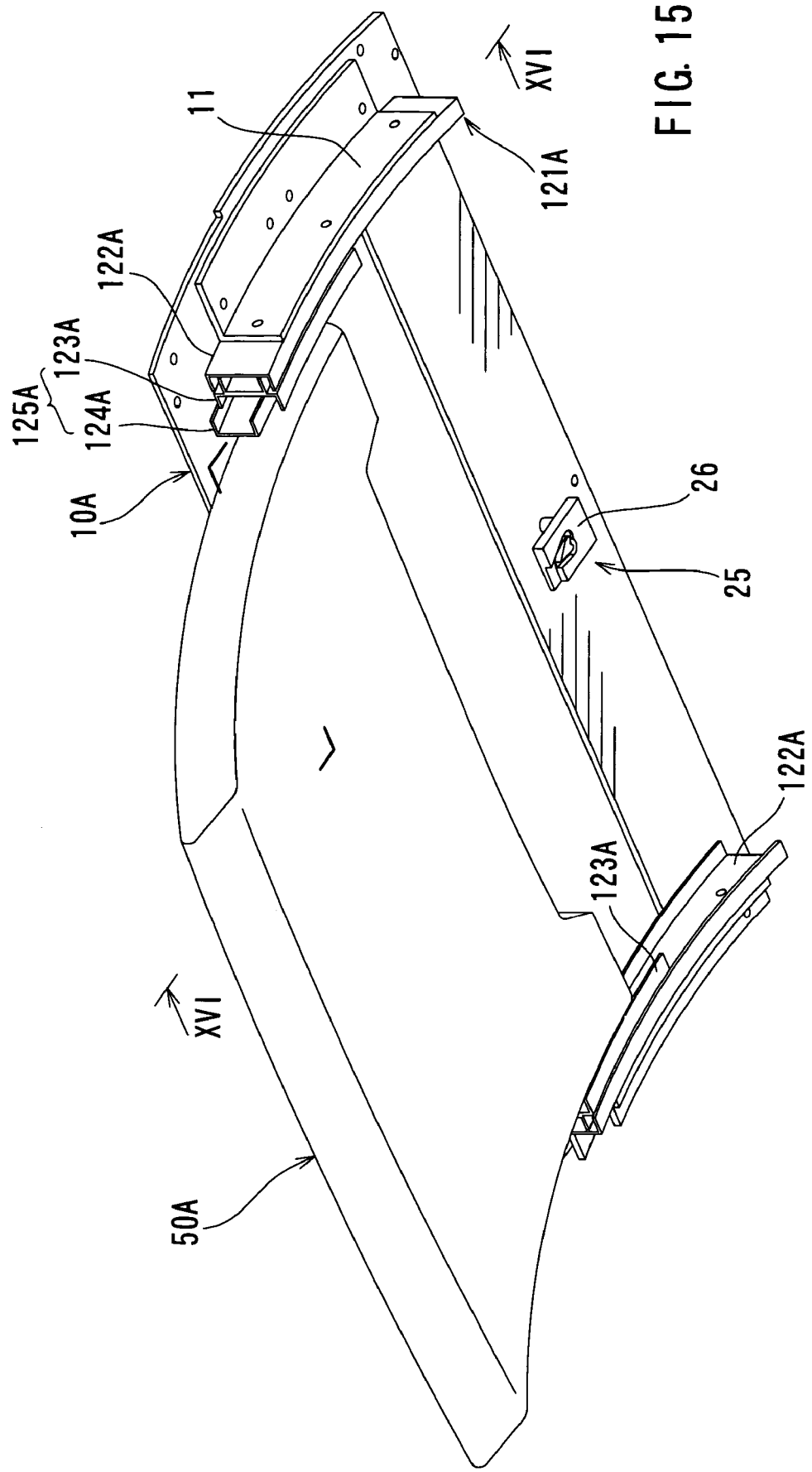
FIG. 15 is a perspective view as viewed from the lower side of a vehicle sun visor according to a second representative embodiment of the present invention and showing a visor body withdrawn from the storage space of the vehicle cabin ceiling.
Figure 16:
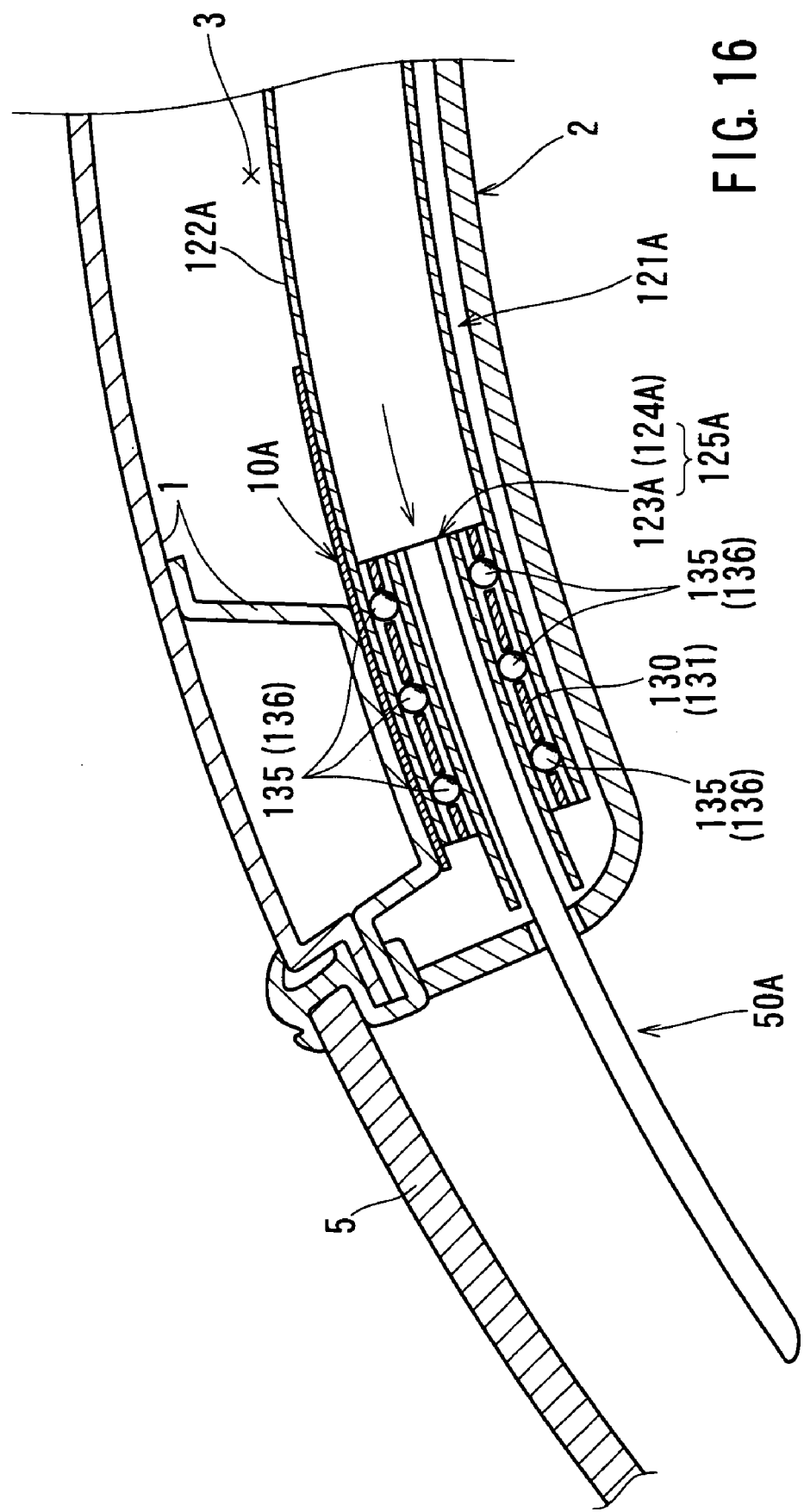
FIG. 16 is a partial cross-sectional view take along line XVI-XVI in FIG. 15.

The second representative embodiment will now be described with reference to FIGS. 15 and 16. The second representative embodiment is different from the first representative embodiment in that (1) a visor body 50A has an upwardly curved configuration, (2) a pair of stationary rails 122A and a pair of slidable rails 125A, each including a first slidable rail 123A and a second slidable rail 124A, are curved to have a radius of curvature substantially conforming to the radius of curvature of the visor body 50A, and (3) the visor body 50A is directly slidably supported by the second rails 124A of the slidable rails 125A. Also in this representative embodiment, a plurality of rolling members 135, such as spherical steel balls, are rotatably disposed between the opposing walls of the stationary rails 122A and the first slidable rails 123A and are retained by the retainer 130. In addition, a plurality of rolling members 136, such as spherical steel balls, are rotatably disposed between the opposing walls of the first slidable rails 123A and the second slidable rails 124A and are retained by the retainer 131.

Also with this embodiment, as the visor body 50A moves into and out of the storage space 3, the first slidable rails 123A may slide relative to the stationary rails 122A while the rolling members 135 rotate. The second slidable rails 124A may slide relative to the first slidable rails 123A while the rolling members 136 rotate. Therefore, the visor body 50A can move easily and smoothly into and out of the storage space 3.

In addition, since the first and second slidable rails 123A and 124A constitute the slidable rails 125A and are configured as nested rails so as to extend and retract in the moving direction of the visor body 50A relative to the storage space 3, the lengths of the first and second slidable rails 123A and 124A may be minimized while still ensuring the necessary stroke length of movement for the visor body 50A. In other words, the length of the storage space 3 required for storing the first and second slidable rails 123A and 124A can be minimized. Therefore, the guide rail mechanisms 121A can be positioned within a limited length of the storage space 3 of the vehicle cabin ceiling.

Further, in the second representative embodiment as the visor body 50A moves to the end of the withdrawing stroke, the visor body 50A may gradually move downward due to the upwardly curved configuration of the visor body 50A. Therefore, the visor body 50A at the end of the withdrawing stroke may extend substantially vertically so that the visor body 50A may naturally assume a front light-shielding position.

This second representative embodiment is not shown as being constructed such that the visor body 50A can move from a front light-shielding position to a side light-shielding position. However, a similar mechanism as used for the first representative embodiment may be incorporated into the second representative embodiment for movement from a front light-shielding position to a side light-shielding position.

THIRD REPRESENTATIVE EMBODIMENT

Figure 17:
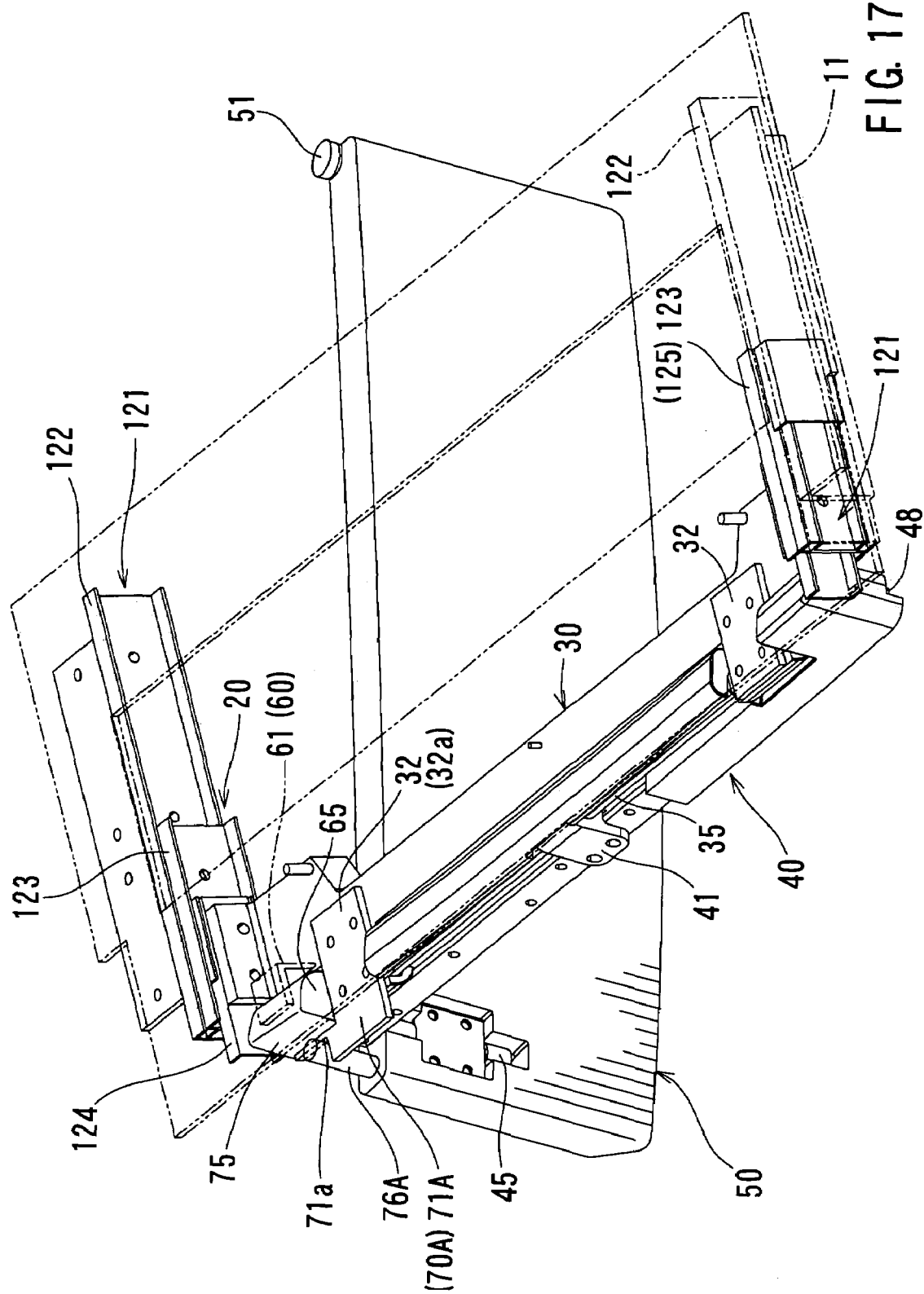
FIG. 17 is a perspective view of a vehicle sun visor according to a third representative embodiment of the present invention and showing a modification of a pivotal movement stopper device.

The third representative embodiment will now be described with reference to FIG. 17. This embodiment differs from the first representative embodiment primarily in the configuration of the stopper device 70 for preventing the visor body 50 from pivoting about the transverse shaft 35 when the visor body 50 has been positioned in a side light-shielding position. As shown in FIG. 17, a stopper device 70A of this representative embodiment includes a stopper 71A, a first engaging portion 75, and a second engaging portion 76A. The stopper 71A is similar to the stopper 71 and is formed integrally with the support plate 32a attached to the first support member 30. However, the stopper 71A is partly cut out to form a stopper portion 71a. The second engaging portion 76A is formed integrally with the right end of the visor body 50 similar to the second engaging portion 76, but the second engaging portion 76A is positioned so as to engage the front edge of the stopper portion 71a in order to prevent further pivotal movement of the visor body 50 about the transverse shaft 35 when the visor body 50 has been pivoted so as to decrease the pivot angle.

Alternatively, the stopper 71A or 71a may be mounted to members other than the first support member 30. For example, the stopper may be mounted to the roof panel 1, the stationary base 10, or other members that are fixedly mounted to the stationary base 10.

In addition, in the above first and third representative embodiments, the stopper member 61 of the stopper device 60, used for preventing the rearward movement of the visor body 50, is mounted to the stationary base 10. However, the stopper member 61 may be mounted to members other than the stationary base 10. For example, the stopper member 61 may be mounted to the roof panel 1, the bracket(s) 11 of the stationary base 10, or the stationary rail(s) 122.

Further, in the above first and third representative embodiments, the arc-shaped engaging surface 67 of the stopper device 60 is formed on the engaging portion 65 of the right end of the second support member 40. However, the engaging surface 67 may also be formed on a part of the visor body 50.

Alternative arrangements of the stopper device 60 will now be described with references to FIGS. 18 and 19 in connection with the fourth and fifth representative embodiments.

FOURTH REPRESENTATIVE EMBODIMENT

Figure 18:
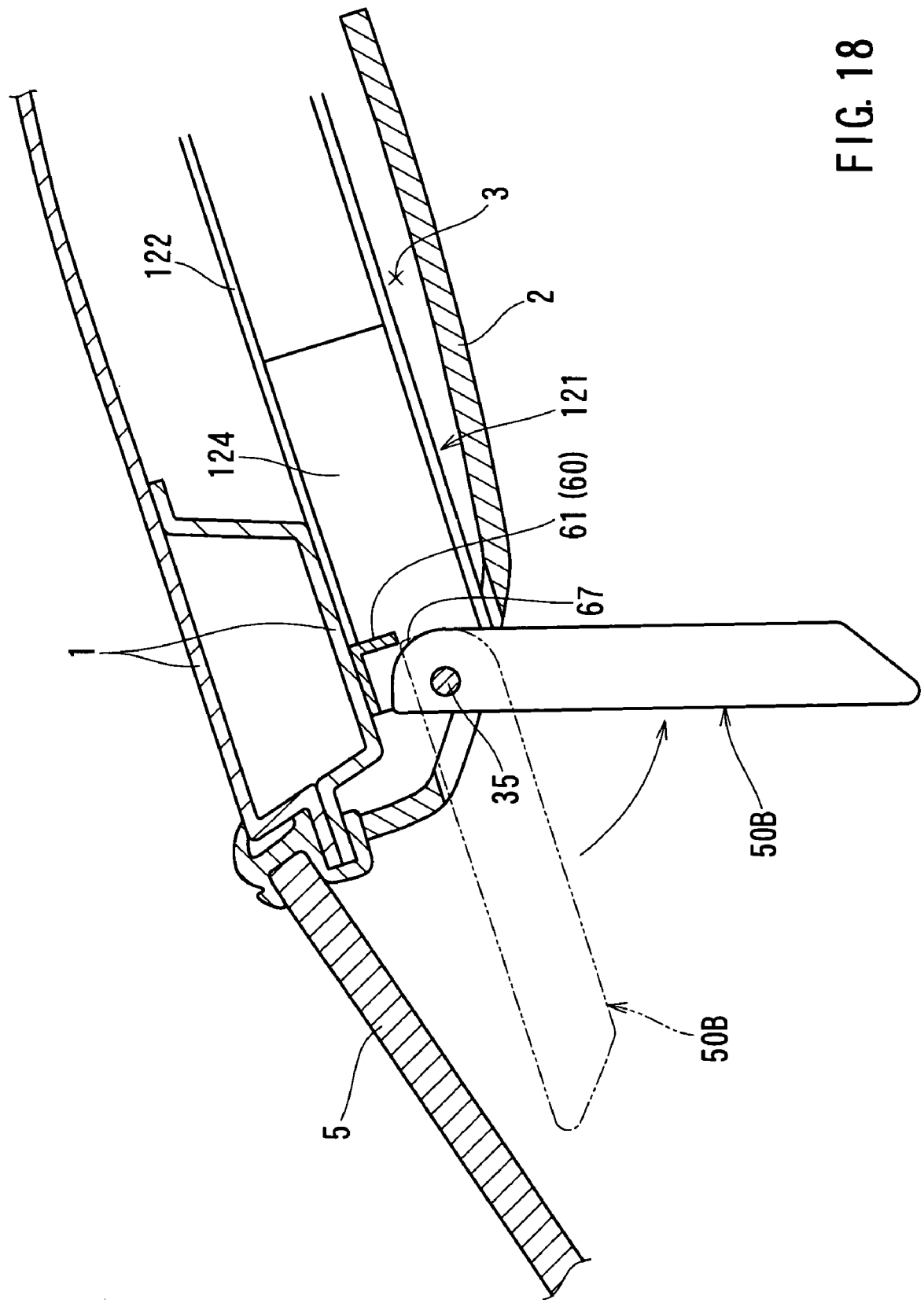
FIG. 18 is a partial cross-sectional view of a vehicle sun visor according to a fourth representative embodiment of the present invention and showing a modification of a rearward movement stopper device.
Figure 19:
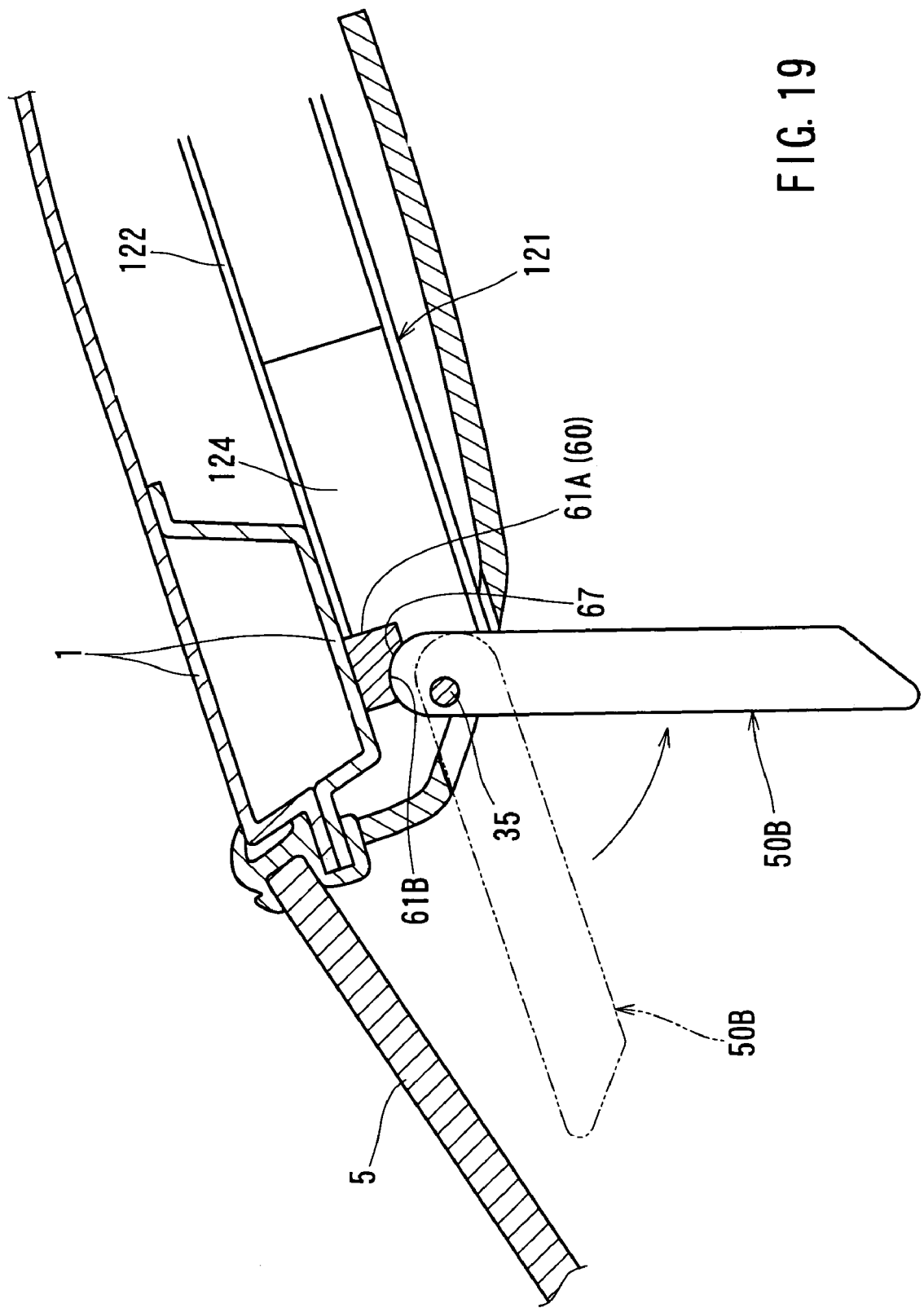
FIG. 19 is a partial cross-sectional view of a vehicle sun visor according to a fifth representative embodiment of the present invention and showing another modification of a rearward movement stopper device.
Figure 20:
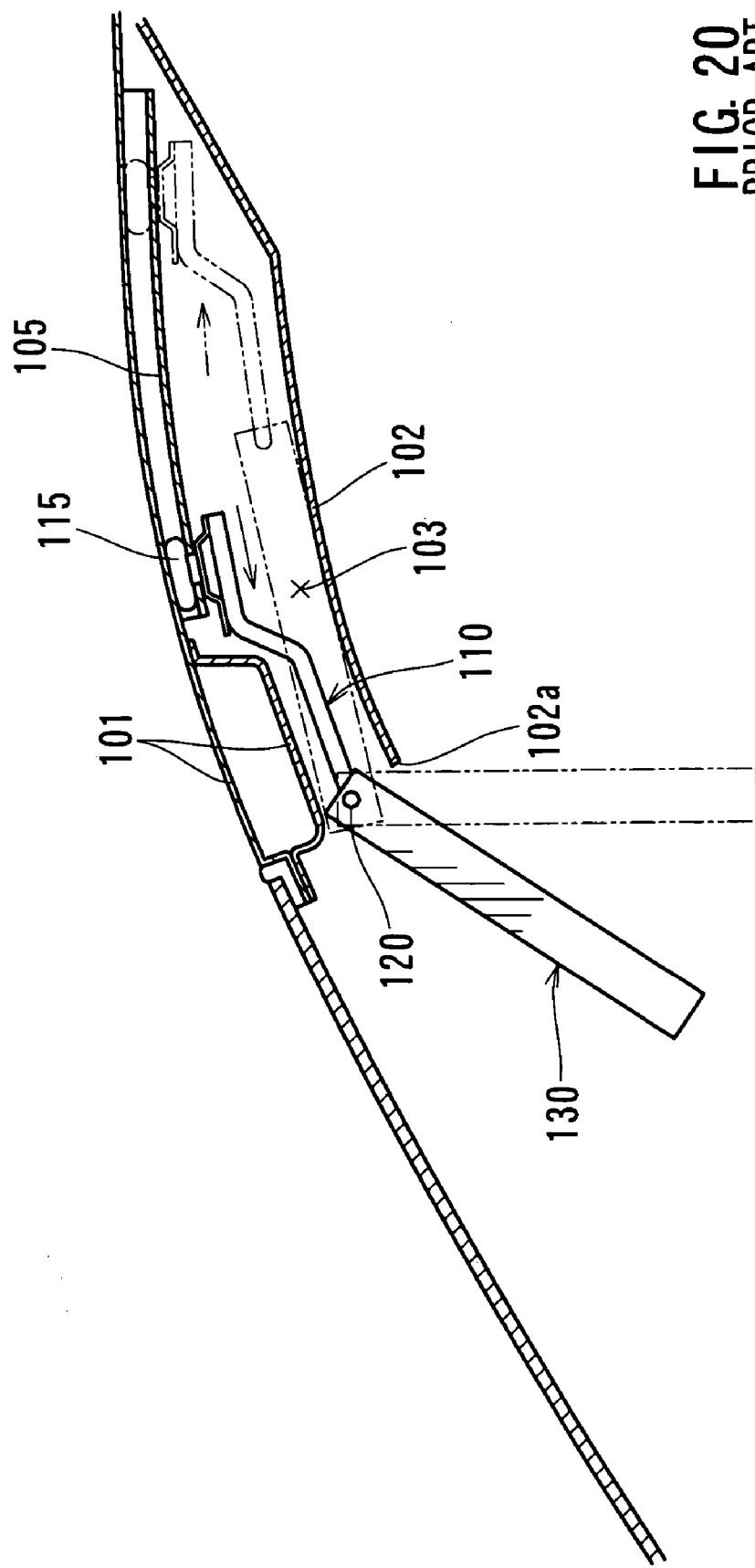
FIG. 20 is a schematic cross-sectional view of a known vehicle sun visor.

In the fourth representative embodiment, the stopper member 61 is directly mounted to the lower surface of the roof panel 1, as shown in FIG. 18. Additionally, the arc-shaped engaging surface 67 is directly formed on the rear end of the visor body 50B. In this configuration, the transverse shaft 35 is mounted to and between the second slidable rails 124 of the slidable rails 125 and pivotally supports the visor body 50B. With this arrangement, the first and second supporting members 30 and 40 may be eliminated, although the visor body 50B may not be able to move to a side light-shielding position.

FIFTH REPRESENTATIVE EMBODIMENT

The fifth representative embodiment is a further modification of the fourth representative embodiment. Similar to the fourth representative embodiment, the arc-shaped engaging surface 67 is directly formed on a rear portion of the visor body 50B that is pivotally supported by the transverse shaft 35. In addition, a stopper member 61A, corresponding to the stopper member 61, is directly mounted to the roof panel 1. However, the stopper member 61A has an arc-shaped engaging surface 61B that is configured as a concave surface substantially corresponding to the arc-shaped engaging surface 67. The arc-shaped engaging surface 61B slidably contacts with the engaging surface 67 when the visor body 50B has been pivoted to the front light-shielding position (indicated by solid lines in FIG. 19) at any desired pivot angle. Also with this arrangement, it is possible to prevent the visor body 50B from accidentally pivoting about the transverse shaft 35.

OTHER POSSIBLE EMBODIMENTS

Figure 21:
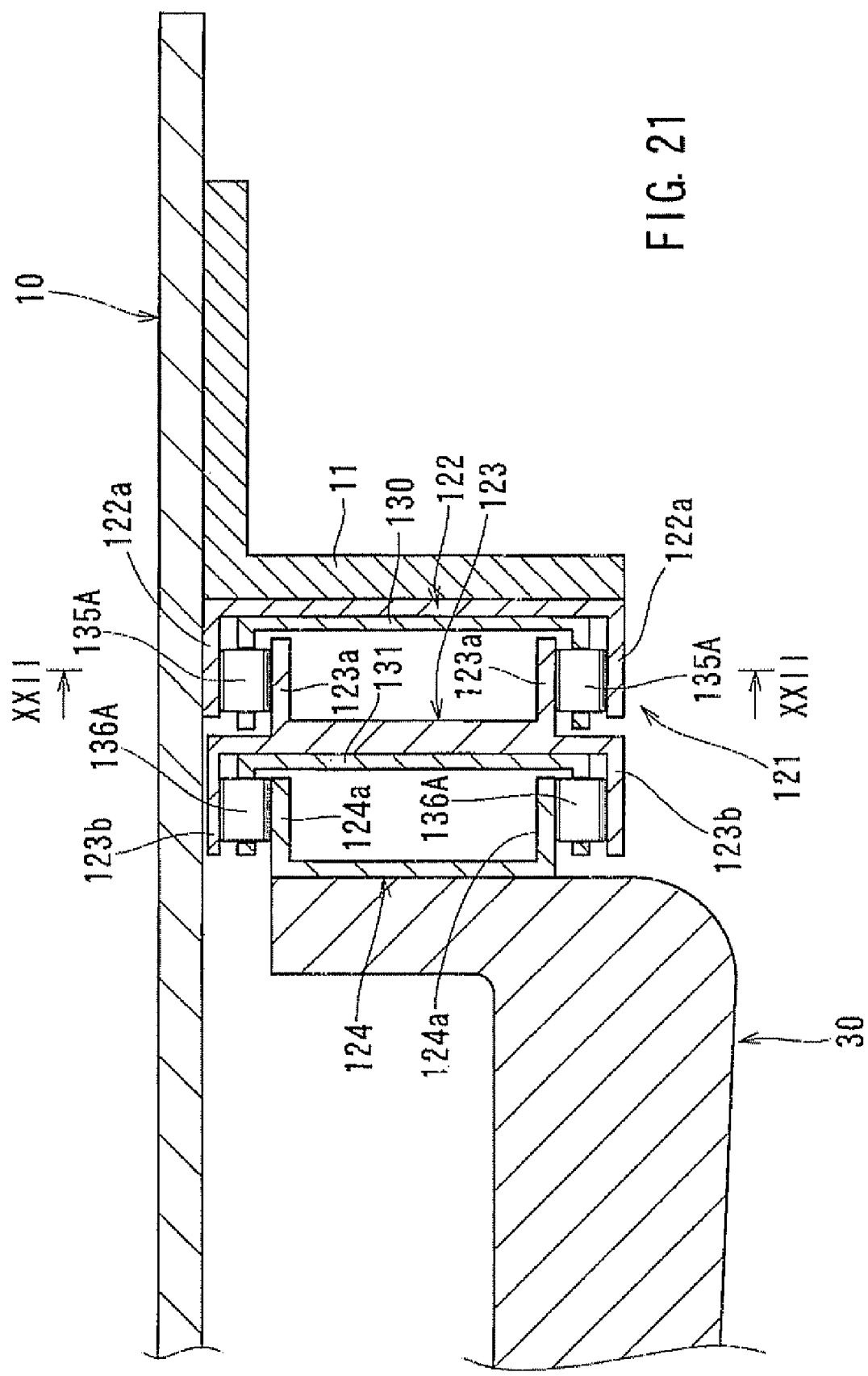
FIG. 21 is a partial cross-sectional view similar to FIG. 5, but shows an alternative embodiment.
Figure 22:
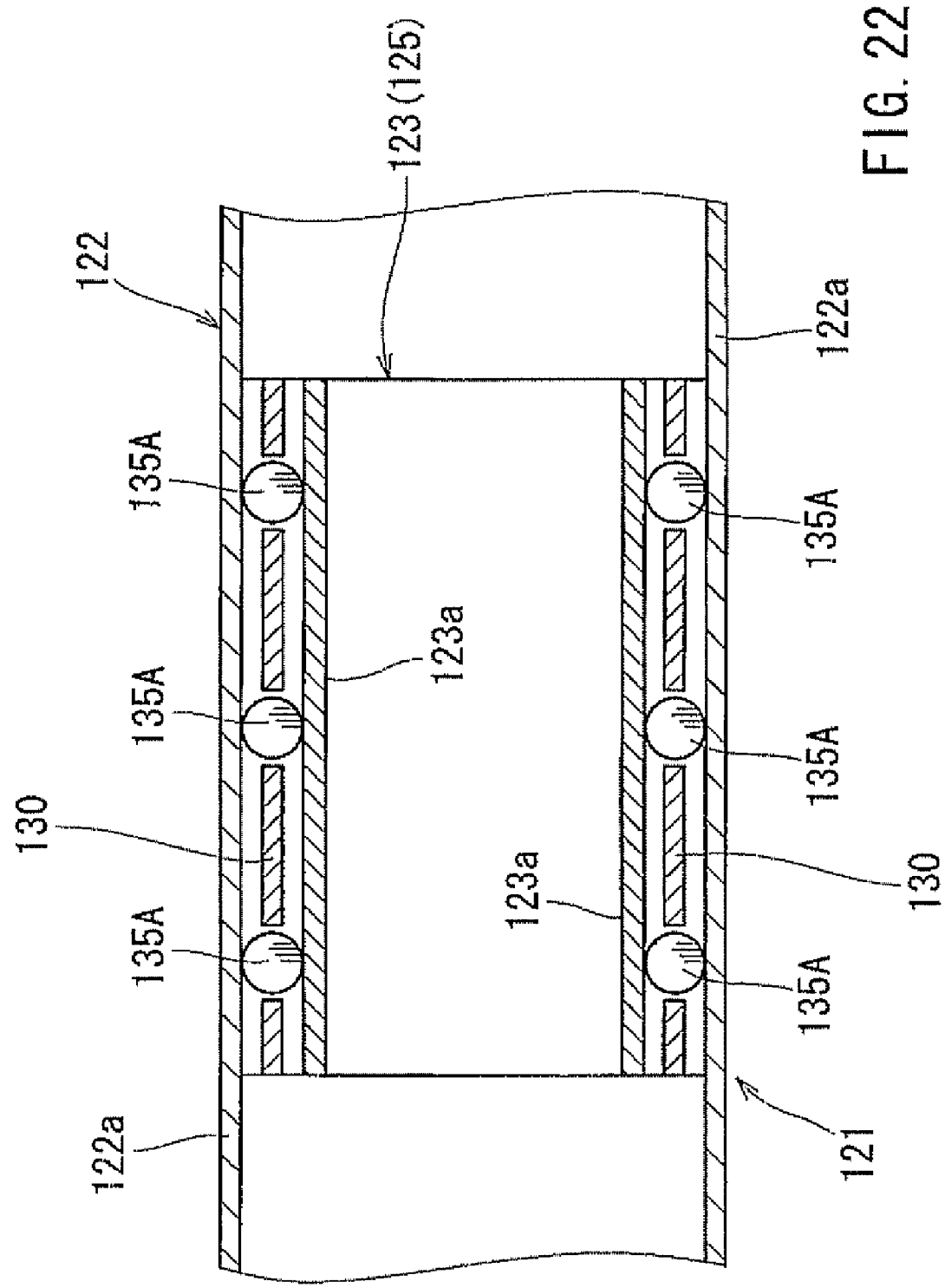
FIG. 22 is a partial cross-sectional taken along line XXII-XXII in FIG. 21.

The present invention may not be limited to the above representative embodiments but may be modified in various ways and still remain within the teachings of the present invention. For example, the rolling members 135 and 136 of the guide rail mechanism 121 are described as spherical balls, such as steel ball bearings. However, the rolling members 135 and 136 may be cylindrical rollers 135A and 136A as shown in the embodiment of FIGS. 21 and 22, such as those used in roller bearings. FIGS. 21 and 22 are alternative embodiments to FIGS. 5 and 6 of the first representative embodiment.

In addition, each of the slidable rails 125 has a first slidable rail 123, which is slidable relative to the corresponding stationary rail 122, and a second slidable rail 124, which is slidable relative to the corresponding first slidable rail 123. However, each of the slidable rails 125 may have a single long slidable rail elongated in the forward and rearward directions in place of the first and second slidable rails 123 and 124.

Further, the guide rail mechanism 121 may be replaced with any another slide mechanisms. For example, a slot(s) or a recess(es) elongated in the forward and rearward directions, and a slide member(s), such as a pin(s), slidably engaging the slot(s) or the recess(es) can be used.

Furthermore, in order to hold the visor body 50 at the storage position, the push-to-release lock device 25 may be replaced with any other devices, such as a device for applying a friction force against the visor body 50 when the visor body 50 is in the storage position.

This invention claims:

1. A vehicle sun visor comprising:
   a visor body; and
   a support and guide device arranged and constructed to support and guide the visor body, so that the visor body is movable along a first direction between a storage position within a storage space defined in a vehicle cabin ceiling and a withdrawn position located outside of the storage space;
   wherein the support and guide device comprises a stationary base fixedly mounted within the storage space, a guide mechanism mounted to the stationary base, and a support device guided by the guide mechanism;
   wherein the support device includes a first support member and a second support member; and wherein the first support member is movable in a direction substantially parallel to the first direction under the guidance of the guide mechanism; and wherein the second support member is pivotally mounted to the first support member about a first axis, so that the visor body is movable from the withdrawn position to a first light-shielding position as the second support member pivots about the first axis; and wherein the visor body is pivotally mounted to the second support member about a second axis that is substantially perpendicular to the first axis, so that the visor body is movable from the first light-shielding position to a second light shielding position as the visor body pivots about the second axis.

2. The vehicle sun visor as in claim 1, wherein the guide mechanism comprises:

a stationary rail fixedly mounted to the stationary base and extending substantially parallel to the first direction; and a slidable rail slidable relative to and along the stationary rail and supporting the first support member; and a plurality of rolling members disposed between the stationary rail and the slidable rail and in rotatable contact therewith; and wherein the plurality of rolling members is arranged in series in a direction substantially parallel to the first direction.

3. The vehicle sun visor as in claim 2, wherein the plurality of rolling members comprises spherical balls.

4. The vehicle sun visor as in claim 2, wherein the plurality of rolling members comprises cylindrical rollers.

5. The vehicle sun visors as in claim 2, wherein the slidable rail comprises a first slidable rail slidable relative to and along the stationary rail, and a second slidable rail slidable relative to and along the first slidable rail, and wherein the first support member is mounted to the second slidable rail.

6. The vehicle sun visor as in claim 5, wherein the plurality of rolling members comprises a plurality of first rolling members disposed between the stationary rail and the first slidable rail and a plurality of second rolling members disposed between the first slidable rail and the second slidable rail.

7. The vehicle sun visor as in claim 5, wherein the guide mechanism comprises a pair of stationary rails, a pair of first slidable rails, and a pair of second slidable rails.

8. The vehicle sun visor as in claim 1, further comprising a lock device arranged and constructed to releasably lock the visor body in the storage position within the storage space.

9. The vehicle sun visor as in claim 8, wherein the lock device comprises a heart-shaped cam recess and a lock pin;

wherein the lock pin engages the cam recess to lock the visor body in the storage position when the visor body has moved from the withdrawn position to the storage position, and wherein the lock pin is disengaged from the cam recess to release the visor body from the lock when the visor body in the storage position has been pressed to further move in a direction opposite to the first direction.

10. The vehicle sun visor as in claim 1, further comprising a first stopper device arranged and constructed to prevent the visor body from pivoting about the first axis at least when the visor body is in the second light-shielding position.

11. The vehicle sun visor as in claim 10, wherein the first stopper device comprises a first stopper, a first engaging member and a second engaging member; and wherein the first stopper is mounted to the first support member; and wherein the first engaging member is disposed on the second support member and opposes the first stopper in a first pivotal direction about the first axis at least when the visor body is in the second light-shielding position; and wherein the second engaging member is disposed on the visor body and opposes the first stopper in a second pivotal direction opposite to the first pivotal direction at least when the visor body is in the second light-shielding position.

12. The vehicle sun visor as in claim 1, further comprising a second stopper device arranged and constructed to prevent the visor body from moving rearward toward the storage position at least after the visor body has been pivoted to the first light-shielding position.

13. The vehicle sun visor as in claim 12, wherein the second stopper device comprises a second stopper and a third engaging member; and wherein the second stopper is disposed on the stationary base; and wherein the third engaging member is disposed on the second support member and opposes the second stopper in a direction substantially parallel to the first direction at least when the visor body has been pivoted to the first light-shielding position.

14. The vehicle sun visor as in claim 13, wherein the second stopper has a stopper portion extending substantially perpendicular to the first direction; and wherein the third engaging member defines a substantially arc-shaped engaging surface about the first axis, so that the engaging surface opposes the stopper portion of the second stopper in a direction substantially parallel to the first direction at least when the visor body has been pivoted to the first position, and wherein the engaging surface does not oppose the stopper portion of the second stopper so as to permit movement of the visor body in the first direction when the visor body has not been pivoted to the first light-shielding position.

15. The vehicle sun visor as in claim 14, wherein the stopper portion has a substantially arc-shaped configuration conforming to the configuration of the engaging surface of the third engaging member, and wherein the stopper portion frictionally contacts with the engaging surface at least when the visor body is in the first light-shielding position.

16. A vehicle sun visor comprising:

a visor body; and a support and guide mechanism arranged and constructed to hold and direct the visor body, so that the visor body is movable along a first direction between a storage position within a storage space defined within a vehicle cabin ceiling and a withdrawn position located outside of the storage space;

wherein the guide mechanism comprises:
a stationary rail fixedly mounted within the storage space and extending substantially parallel to the first direction; and
a slidable rail slidable relative to and along the stationary rail and holding the visor body; and
a plurality of rolling members disposed between the stationary rail and the slidable rail and rotatably contacting therewith; and
wherein the plurality of rolling members is arranged in series in a direction substantially parallel to the first direction.

17. The vehicle sun visor as in claim 16, wherein the plurality of rolling members comprises spherical balls.

18. The vehicle sun visor as in claim 16, wherein the plurality of rolling members comprises cylindrical rollers.

19. The vehicle sun visors as in claim 16,
wherein the slide rail comprises a first slidable rail slidable relative to and along the stationary rail, and a second slidable rail slidable relative to and along the first slidable rail, and
wherein the visor body is mounted to the second slidable rail.

20. The vehicle sun visor as in claim 19,
wherein the plurality of rolling members comprises a plurality of first rolling members disposed between the stationary rail and the first slidable rail and a plurality of second rolling members disposed between the first slidable rail and the second slidable rail.

21. The vehicle sun visor as in claim 19,
wherein the support and guide mechanism comprises a pair of stationary rails, a pair of first slidable rails, and a pair of second slidable rails.

22. The vehicle sun visor as in claim 16, wherein the stationary rail and the slidable rail extend along a curved path, so that the visor body is operable so as to shield light in the withdrawn position.

23. The vehicle sun visor as in claim 16,
further comprising a lock device arranged and constructed to releasably lock the visor body in the storage position within the storage space.

24. The vehicle sun visor as in claim 23,
wherein the lock device comprises a heart-shaped cam recess and a lock pin; and
wherein the lock pin engages the cam recess to lock the visor body in the storage position when the visor body has been moved from the withdrawn position to the storage position, and
wherein the lock pin is disengaged from the cam recess to release the visor body from the lock when the visor body in the storage position has been pressed to further move in a direction opposite to the first direction.

25. A vehicle sun visor comprising:
a visor body; and
a support and guide device arranged and constructed to support and guide the visor body, so that the visor body is movable along a first direction between a storage position within a storage space defined within a vehicle cabin ceiling and a withdrawn position located outside of the storage space;
wherein the visor body is pivotable about a first axis so as to move from the withdrawn position to a first light-shielding position and is pivotable about a second axis that is substantially perpendicular to the first axis so as to move from the first light shielding position to a second light-shielding position; and
a pivotal movement stopping device arranged and constructed to prevent the visor body from further pivoting about the first axis at least after the visor body has been pivoted from the first light-shielding position to the second light-shielding position about the second axis.

26. The vehicle sun visor as in claim 25,
wherein the pivotal movement stopping device comprises a first stopper, a first engaging member, and a second engaging member; and
wherein the first stopper is fixed in position with respect to a direction substantially perpendicular to the first direction;
wherein the first engaging member and the second engaging member are movable with the visor body and respectively oppose the first stopper in a first pivotal direction about the first axis and a second pivotal direction opposite to the first pivotal direction at least when the visor body is in the second light-shielding position.

27. The vehicle sun visor as in claim 26,
wherein the support and guide device comprises a stationary base fixedly mounted within the storage space, a guide mechanism mounted to the stationary base, and a support device guided by the guide mechanism; and
wherein the support device includes a first support member and a second support member; and
wherein the first support member is movable in a direction substantially parallel to the first direction under the guidance of the guide mechanism; and
wherein the second support member is pivotable about the first axis, and
wherein the visor body is pivotally mounted to the second support member about the second axis.

28. A vehicle sun visor comprising:
a visor body; and
a support and guide device arranged and constructed to support and guide the visor body, so that the visor body is movable along a first direction between a storage position within a storage space defined within a vehicle cabin ceiling and a withdrawn position located outside of the storage space;
wherein the visor body is pivotable about a first axis so as to move from the withdrawn position to a first light-shielding position; and
a rearward movement stopping device arranged and constructed to prevent the visor body from moving rearward toward the storage position at least after the visor body has been pivoted to the first light-shielding position.

29. The vehicle sun visor as in claim 28,
wherein the rearward movement stopping device comprises a stopper and an engaging member; and
wherein the stopper is fixed in position relative to the vehicle cabin ceiling; and
wherein the engaging member is movable with the visor body and opposes the stopper in a direction substantially parallel to the first direction at least when the visor body has been pivoted to the first light-shielding position.

30. The vehicle sun visor as in claim 29,
wherein the stopper has a stopper portion extending substantially perpendicular to the first direction; and wherein the engaging member defines a substantially arc-shaped engaging surface about the first axis, so that the engaging surface opposes the stopper portion of the stopper in a direction substantially parallel to the first direction at least when the visor body has been pivoted to the first position, and wherein the engaging surface does not oppose the stopper portion of the stopper and permits movement of the visor body in the first direction when the visor body has not been pivoted to the first light-shielding position.

31. The vehicle sun visor as in claim 30, wherein the stopper portion has a substantially arc-shaped configuration conforming to the configuration of the engaging surface of the engaging member, and wherein the stopper portion frictionally contacts with the engaging surface at least when the visor body is in the first light-shielding position.

32. The vehicle sun visor as in claim 29, wherein the stopper is fixedly mounted within the storage space; and wherein the engaging member is integrally formed with the visor body.

33. The vehicle sun visor as in claim 29, wherein the support and guide device comprises a stationary base fixedly mounted within the storage space, a guide mechanism mounted to the stationary base, and a support device guided by the guide mechanism; and wherein the support device includes a first support member and a second support member; and wherein the first support member is movable in a direction substantially parallel to the first direction under the guidance of the guide mechanism; and wherein the second support member is pivotable about the first axis, and wherein the visor body is pivotally mounted to the second support member about the second axis.

34. The vehicle sun visor as in claim 33, wherein the stopper is fixedly mounted to the stationary base, and wherein the engaging member is integrally formed with the second support member.

* * * * *